(12) United States Patent
Park et al.

(10) Patent No.: US 12,284,611 B2
(45) Date of Patent: *Apr. 22, 2025

(54) METHOD AND APPARATUS FOR GENERATING TRAINING SIGNAL USING PREDETERMINED BINARY SEQUENCE IN WIRELESS LAN SYSTEM

(71) Applicant: LG Electronics Inc., Seoul (KR)

(72) Inventors: Eunsung Park, Seoul (KR); Jinsoo Choi, Seoul (KR); Hangyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,488

(22) Filed: Jan. 18, 2024

(65) Prior Publication Data
US 2024/0163795 A1 May 16, 2024

Related U.S. Application Data

(63) Continuation of application No. 18/101,005, filed on Jan. 24, 2023, now Pat. No. 11,930,454, which is a (Continued)

(51) Int. Cl.
*H04W 52/02* (2009.01)
*H04L 5/00* (2006.01)
(Continued)

(52) U.S. Cl.
CPC ........... *H04W 52/0229* (2013.01); *H04L 5/00* (2013.01); *H04L 25/03* (2013.01);
(Continued)

(58) Field of Classification Search
CPC ........... H04W 52/0229; H04W 28/065; H04W 84/12; H04L 5/00; H04L 25/03;
(Continued)

(56) References Cited

U.S. PATENT DOCUMENTS

| 7,778,362 B2 | 8/2010 | Shor |
| 8,072,959 B2 | 12/2011 | Chen |

(Continued)

FOREIGN PATENT DOCUMENTS

| CN | 101009511 | 8/2007 |
| CN | 101577580 | 11/2009 |

(Continued)

OTHER PUBLICATIONS

Extended European Search Report in European Appln. No. 16833373.0, dated Jan. 24, 2019, 6 pages.

(Continued)

*Primary Examiner* — Steven Hieu D Nguyen
(74) *Attorney, Agent, or Firm* — Fish & Richardson P.C.

(57) ABSTRACT

Disclosed are a method and an apparatus for generating an STF signal usable in a wireless LAN system. The STF signal is included in a field used to improve AGC estimation of a MIMO transmission. A portion of the STF signal is used to transmit an uplink, and can be used for uplink MU PPDUs transmitted from a plurality of STAs. The STF signal that is disclosed, for example, is used for a 40 MHz band or an 80 MHz band, is desirably usable for the 40 MHz band, and can be generated based on a sequence in which a predetermined M sequence is repeated. The predetermined M sequence can be a binary sequence of which the length is 15 bits.

10 Claims, 34 Drawing Sheets

Related U.S. Application Data continuation of application No. 17/159,865, filed on Jan. 27, 2021, now Pat. No. 11,582,695, which is a continuation of application No. 16/870,328, filed on May 8, 2020, now Pat. No. 10,939,377, which is a continuation of application No. 16/248,681, filed on Jan. 15, 2019, now Pat. No. 10,791,519, which is a continuation of application No. 15/517,434, filed as application No. PCT/KR2016/008629 on Aug. 5, 2016, now Pat. No. 10,257,784.

(60) Provisional application No. 62/313,112, filed on Mar. 24, 2016, provisional application No. 62/202,165, filed on Aug. 7, 2015, provisional application No. 62/202,124, filed on Aug. 6, 2015, provisional application No. 62/201,586, filed on Aug. 6, 2015.

(51) Int. Cl.

| | | |
|---|---|---|
| H04L 25/03 | (2006.01) | |
| H04L 27/26 | (2006.01) | |
| H04L 27/34 | (2006.01) | |
| H04W 28/06 | (2009.01) | |
| H04W 84/12 | (2009.01) | |
| H04B 7/0413 | (2017.01) | |

(52) U.S. Cl.
CPC .... *H04L 27/26025* (2021.01); *H04L 27/2613* (2013.01); *H04L 27/34* (2013.01); *H04W 28/065* (2013.01); *H04W 84/12* (2013.01); *H04B 7/0413* (2013.01); *H04L 5/0051* (2013.01); *H04L 5/0053* (2013.01); *Y02D 30/70* (2020.08)

(58) Field of Classification Search
CPC ........... H04L 27/26025; H04L 27/2613; H04L 27/34; H04L 5/0051; H04L 5/0053; H04L 27/2602; H04L 25/03178; H04L 27/3411; H04B 7/0413; H04B 7/0452; Y02D 30/70
See application file for complete search history.

(56) References Cited

U.S. PATENT DOCUMENTS

| | | | |
|---|---|---|---|
| 9,042,331 | B2 | 5/2015 | Lee et al. |
| 9,923,748 | B2 | 3/2018 | Porat et al. |
| 9,973,353 | B2 | 5/2018 | Park et al. |
| 10,212,005 | B2 | 2/2019 | Park et al. |
| 10,257,784 | B2 | 4/2019 | Park et al. |
| 10,320,590 | B2 | 6/2019 | Park et al. |
| 10,432,444 | B2 | 10/2019 | Porat et al. |
| 10,454,612 | B2 | 10/2019 | Park et al. |
| 10,623,223 | B2 | 4/2020 | Park et al. |
| 10,897,380 | B2 | 1/2021 | Park et al. |
| 10,939,376 | B2 | 3/2021 | Park et al. |
| 10,939,377 | B2 * | 3/2021 | Park .................. H04L 27/26025 |
| 2006/0215774 | A1 | 9/2006 | Shor |
| 2007/0217378 | A1 | 9/2007 | Moorti et al. |
| 2011/0013583 | A1 | 1/2011 | Yang et al. |
| 2012/0269124 | A1 | 10/2012 | Porat |
| 2013/0215993 | A1 | 8/2013 | Nasrabadi et al. |
| 2013/0230120 | A1 | 9/2013 | Yang et al. |
| 2013/0242963 | A1 | 9/2013 | Van Nee et al. |
| 2014/0010326 | A1 | 1/2014 | Chari |
| 2014/0140312 | A1 | 5/2014 | Lee et al. |
| 2015/0103965 | A1 | 4/2015 | Chari |
| 2016/0255645 | A1 | 9/2016 | Li et al. |
| 2016/0261452 | A1 * | 9/2016 | Porat .................. H04L 27/2656 |
| 2016/0302232 | A1 | 10/2016 | Ghosh |
| 2017/0195107 | A1 | 7/2017 | Liu |
| 2017/0202026 | A1 | 7/2017 | Ahn et al. |
| 2017/0280383 | A1 | 9/2017 | Park et al. |
| 2017/0303201 | A1 | 10/2017 | Park et al. |
| 2017/0310386 | A1 | 10/2017 | Liu et al. |
| 2019/0053240 | A1 | 2/2019 | Park et al. |
| 2019/0260614 | A1 | 8/2019 | Park et al. |

FOREIGN PATENT DOCUMENTS

| | | |
|---|---|---|
| CN | 102143574 | 8/2011 |
| CN | 103023835 | 4/2013 |
| CN | 103548294 | 1/2014 |
| CN | 104104462 | 10/2014 |
| CN | 104115542 | 10/2014 |
| JP | 2013-503575 | 1/2013 |
| KR | 10-2014-0021492 | 2/2014 |
| KR | 10-2014-0124370 | 10/2014 |
| KR | 10-2015-0008470 | 1/2015 |
| KR | 10-2015-0128236 | 11/2015 |
| WO | WO 2011/026079 | 3/2011 |

OTHER PUBLICATIONS

IEEE.org [online], "IEEE 802.11N MAC Layer," Feb. 2009, retrieved from URL <https://ieeexplore.iece.org/servlet/opac?mdnumber=EW1086>, 1 page.

International Search Report in International Appln. No. PCT/KR2016/008629, dated Nov. 7, 2016, 2 pages.

Lee et al., "PARP reduction of Legacy portion of VHT PLCP Preamble," doc:IEEE 802.11-10/0795r1, Jul. 2010, 31 pages.

Meili & Junpgeng, "Research on Cooperative Jamming in Complex Electromagnetic Environment," Journal of Telemetry, 2010, 31(4):30-35, 6 pages (with English Abstract).

Notice of Allowance in Japanese Appln. No. 2017-518336, dated Oct. 24, 2018, 3 pages.

Notice of Allowance in Korean Appln. No. 10-2017-7008540, dated Dec. 3, 2018, 2 pages.

Notice of Allowance in U.S. Appl. No. 15/517,434, dated Oct. 11, 2018, 8 pages.

Office Action in Chinese Appln. No. 201680003069.7, dated Jun. 21, 2019, 10 pages (with English translation).

Office Action in Chinese Appln. No. 201680003069.7, dated Jun. 21, 2019, 5 pages.

Office Action in Chinese Appln. No. 202010418049.4, dated Aug. 24, 2022, 6 pages.

Office Action in Chinese Appln. No. 202010418051.1, dated Aug. 24, 2022, 6 pages.

Office Action in Japanese Appln. No. 2017-518336, dated Mar. 6, 2018, 2 pages.

Office Action in U.S. Appl. No. 15/517,434, dated May 22, 2018, 18 pages.

Office Action in U.S. Appl. No. 16/870,328, dated Jul. 13, 2020, 7 pages.

Office Action in U.S. Appl. No. 16/870,325, dated Jul. 13, 2020, 7 pages.

Park et al., "HE-STF Sequences for 160/80+80MHz," doc:IEEE 802.11-16/0335r0, Mar. 2016, 21 pages.

Park et al., "HE-STF Sequences," doc:IEEE 802.11-15/1323r1, Nov. 2015, 28 pages.

Patent Certificate for Chinese Appln. No. 202010418049.4, dated Jun. 6, 2023, 52 pages.

Sun et al., "HE-STF Proposal," doc:IEEE 802.11-15/0381r1, May 2015, 40 pages.

Wu et al., "Carrier Frequencey Offset Estimation for Multiuser MIO OFDM Uplink Using CAZAC Sequences: Performance and Sequence Optimization," EURASIP Journal on Wireless Communications and Networking, Dec. 2012, 1:1-11.

Yang et al., "Improved sparse multipath channel equation method," Journal of Xidian University, Feb. 2014, 41(1):158-163 (with English abstract).

Yuming et al., "A New Synchronization Algorithm for OFDM System Based on the Training Symbol," Journal of Telemetry, 2010, 31(4):25-29, 6 pages (with English Abstract).

Zhang et al., "Proposed Changes for HESTF 80+80MHZ sequence," IEEE P802.11 Wireless LANs, doc: IEEE 802.11-17/1449r0, Aug. 2017, 2 pages.

\* cited by examiner

FIG. 1
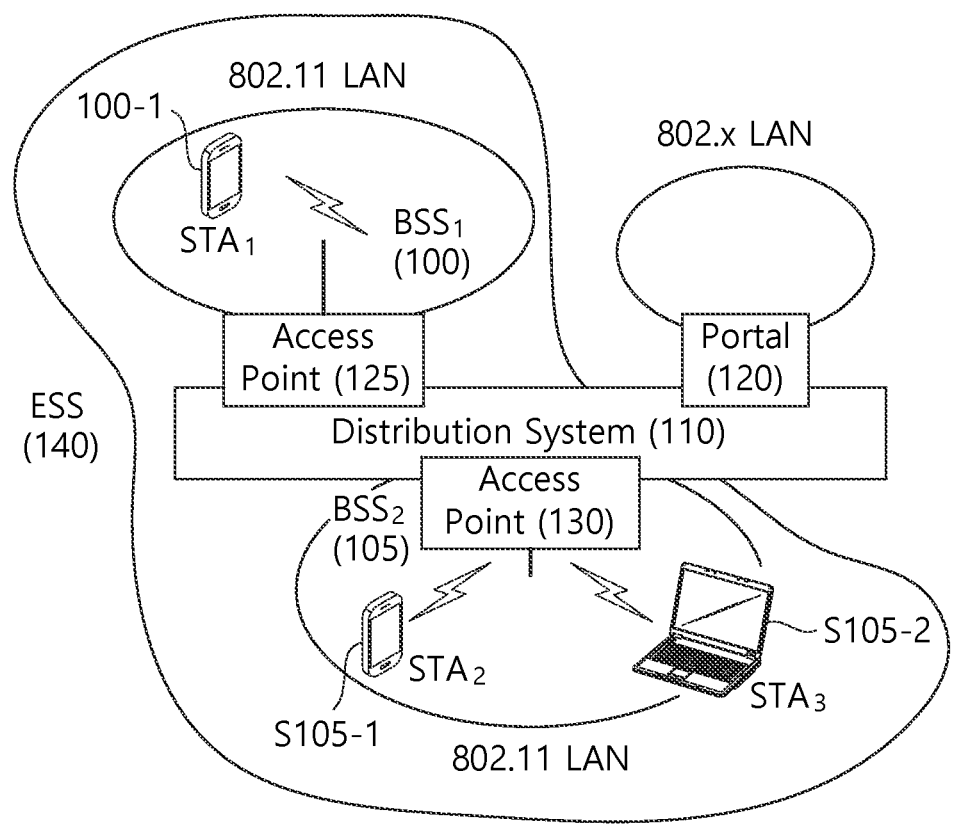
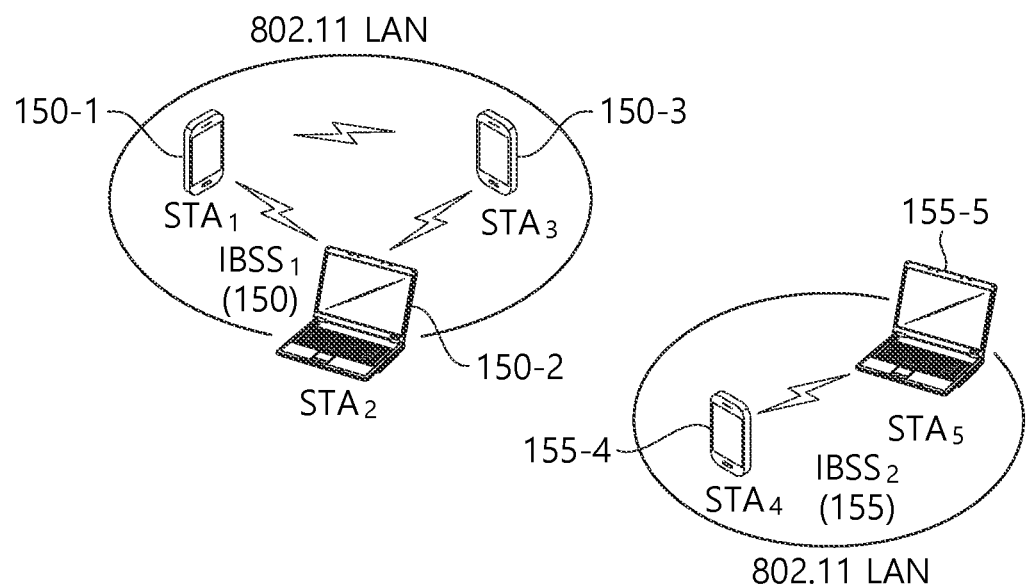

FIG. 2
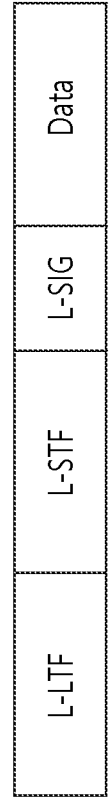
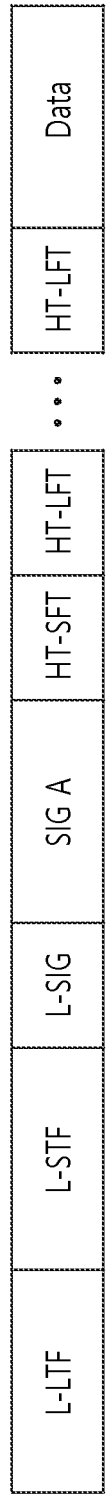

FIG. 16

20MHz  $\{c_1 M\}*(1+j)*Sqrt(1/2)$

40MHz  $\{c_2 M, 0, c_3 M\}*(1+j)*Sqrt(1/2)$

80MHz  $\{c_4 M, \underset{\text{Extra Value}}{\underline{(a_1)}}, c_5 M, 0, c_6 M, \underset{\text{Extra Value}}{\underline{(a_2)}}, c_7 M\}*(1+j)*Sqrt(1/2)$

FIG. 18

20MHz

40MHz $\{c_1 M, 0, c_2 M\}*(1+j)*\text{Sqrt}(1/2)$

80MHz $\{c_3 M, \widehat{a_1}, c_4 M, 0, c_5 M, \widehat{a_2}, c_6 M\}*(1+j)*\text{Sqrt}(1/2)$ $\{c_7 M, \widehat{a_3}, c_8 M, \widehat{a_4}, c_9 M, \widehat{a_5}, c_{10} M, 0, c_{11} M, \widehat{a_6}, c_{12} M, \widehat{a_7}, c_{13} M, \widehat{a_8}, c_{14} M\}*(1+j)*\text{Sqrt}(1/2)$

FIG. 20

| Example (B-1) | 4.77 | 3.75 | 2.22 | 4.77 | | 2.48 | 4.77 | 2.22 | 2.22 | 4.77 | 4.77 | 2.22 | 2.22 | 4.77 | | | 4.77 | 2.22 | 2.22 | 4.77 | 3.75 | 4.77 |
|---|---|---|---|---|---|---|---|---|---|---|---|---|---|---|---|---|---|---|---|---|---|---|
| Example (B-2) | 2.22 | 2.48 | 2.22 | 2.22 | | 2.48 | 2.22 | 4.77 | 4.77 | 4.77 | 4.77 | 4.77 | 4.77 | 2.22 | | | 2.22 | 2.22 | 2.22 | 2.22 | 2.48 | 2.22 |
| | 2.77 | | 4.59 | | | 3.51 | | 4.30 | | 4.30 | | 3.51 | | | 2.48 | | | 4.59 | | | 2.77 |
| | 2.90 | | 4.52 | | | 4.26 | | 5.21 | | 5.21 | | 4.26 | | | 2.48 | | | 4.52 | | | 2.90 |
| | 3.02 | | | | 4.52 | | 4.52 | | 4.52 | | 4.52 | | | | | 3.02 | | | | | |
| | 5.39 | | | | 5.46 | | 4.39 | | 4.39 | | 4.39 | | | | | 5.39 | | | | | |
| | | | | | | | | | 5.21 | | | | | 4.52 | | | | | | | |
| | | | | | | | | | 5.22 | | | | | 5.48 | | | | | | | |

FIG. 21

| | | | | | | | | | | | | | | | | | | |
|---|---|---|---|---|---|---|---|---|---|---|---|---|---|---|---|---|---|---|
| 3.75 | 2.22 | 4.77 | | | 4.77 | 2.22 | 2.22 | 4.77 | 2.48 | 2.22 | 2.22 | 2.48 | | 4.77 | 3.75 | 2.22 | 4.77 | |
| 2.48 | 2.22 | 2.22 | 3.75 | 2.48 | 2.22 | 4.77 | 4.77 | 4.77 | 2.48 | 4.77 | 2.22 | 2.48 | 2.22 | 4.77 | 2.48 | 2.48 | 2.22 | |
| 2.77 | 4.59 | | | | 3.51 | 4.30 | | 3.32 | | 4.92 | | | | 4.90 | | 3.51 | | |
| 2.90 | 4.52 | | | | 4.26 | 5.21 | | 4.80 | | 3.85 | | | | 4.80 | | 4.26 | | |
| 3.02 | | | 5.28 | | | | 4.52 | | 5.25 | | | | | | 4.52 | | | |
| 5.39 | | | 5.50 | | | | 4.39 | | 5.40 | | | | | | 4.39 | | | |
| | | | | | | | | | | | | 2.22 | | | | | | |
| | | | | | | | | | | | | 2.22 | | | | | | |
| | | | | | | | | | | | | | | 5.80 | | | | |
| | | | | | | | | | | | | | | 5.61 | | | | |
| | | | | | | 5.66 | | | | | | | | | | | | |
| | | | | | | 4.79 | | | | | | | | | | | | |

Example (B-1) ---- (4.77)
Example (B-2) ---- (2.22)

20MHz  $\{c_1M, 0, c_2M\}*(1+j)*\text{Sqrt}(1/2)$

40MHz  $\{c_3M, c_4M, 0, c_5M, c_6M\}*(1+j)*\text{Sqrt}(1/2)$

80MHz  $\{c_7M, c_8M, \textcircled{a_1}, c_9M, c_{10}M, \textcircled{a_2}, 0, \textcircled{a_3}, c_{11}M, c_{12}M, \textcircled{a_4}, c_{13}M, c_{14}M\}*(1+j)*\text{Sqrt}(1/2)$

FIG. 25

| | | | | | | | | |
|---|---|---|---|---|---|---|---|---|
| Example (C-1) | 6.02 | 2.22 | 2.22 | 4.77 | | 4.77 | 2.22 | 2.22 | 6.02 |
| Example (C-2) | 2.48 | 2.22 | 4.77 | 2.22 | | 2.22 | 4.77 | 2.22 | 2.48 |
| | 4.89 / 4.79 | | 3.51 / 4.26 | | 1.93 / 1.93 | | 3.51 / 4.26 | | 4.89 / 4.79 |
| | | 4.52 / 4.37 | | | | | | 4.52 / 4.37 | |
| | | | | | 4.40 / 4.40 | | | | |

FIG. 26

| | 4.77 | 3.75 | 2.22 | 4.77 | | 2.22 | 2.22 | 4.77 | 4.77 | 2.22 | 2.22 | | 4.77 | 2.22 | 3.75 | 4.77 |
|---|---|---|---|---|---|---|---|---|---|---|---|---|---|---|---|---|
| | 2.22 | 2.48 | 4.77 | 2.22 | 2.48 | 4.77 | 4.77 | 4.77 | 4.77 | 4.77 | 4.77 | 2.48 | 2.22 | 4.77 | 2.48 | 4.77 |
| Example (C-1) → (4.77) | | | | | | | | | | | | | | | | |
| Example (C-2) → (4.77) | 4.90 | 3.51 | | 4.30 | | 4.30 | 3.51 | | 3.51 | | 4.90 | | | | | |
| | 4.80 | 4.26 | | 5.21 | | 5.21 | 4.26 | | 4.26 | | 4.80 | | | | | |
| | | | 4.52 | | | 4.52 | | | 4.52 | | | 4.52 | | | | |
| | | | 4.39 | | | 4.39 | | | 4.39 | | | 4.39 | | | | |
| | | 4.95 | | | | | | | | 4.95 | | | | | | |
| | | 4.95 | | | | | | | | 4.95 | | | | | | |
| | | | | | 4.32 | | | | | | | | | | | |
| | | | | | 4.32 | | | | | | | | | | | |

FIG. 27

| | | | | | | | | | | | | | | | | | | |
|---|---|---|---|---|---|---|---|---|---|---|---|---|---|---|---|---|---|---|
| Example (C-1) → | (4.77) | 3.75 | 2.22 | 4.77 | | 4.77 | 2.22 | 2.22 | 2.22 | 2.48 | 2.22 | 2.22 | 2.48 | | 4.77 | 4.77 | 3.75 | 2.22 | 4.77 |
| Example (C-2) → | (4.77) | 2.48 | 4.77 | 2.22 | 2.48 / 2.48 | 2.22 | 4.77 | 4.77 | 4.77 | 6.02 | 4.77 | 2.22 | 2.48 | 4.77 / 4.77 | 2.22 | 2.22 | 2.48 | 2.22 | 2.22 |
| | 4.90 | 3.51 | | 3.51 | | | 4.30 | 3.32 | | 4.92 | | | 2.77 | | 4.59 | | | | |
| | 4.80 | 4.26 | | 4.26 | | | 5.21 | 5.70 | | 3.85 | | | 2.90 | | 4.52 | | | | |
| | 4.52 | | | 4.52 | 4.95 | | | 5.25 | | | | | 3.02 | | | | | | |
| | 4.39 | | | 4.39 | 4.95 | | | 4.10 | | | | | 5.39 | | | | | | |
| | | | | | | | | | | | | | 5.32 | | | | | | |
| | | | | | | | | | | | | | 5.58 | | | | | | |
| | | | | | | | | 4.77 | | | | | | | | | | | |
| | | | | | | | | 4.48 | | | | | | | | | | | |

FIG. 28

| Example (C-1) | 4.77 | 3.75 | 4.77 |      | 4.77 |      | 2.48 | 2.22 | 2.22 | 4.77 | 4.77 | 2.22 | 2.22 | 2.22 |      | 4.77 | 2.22 | 4.77 | 3.75 | 4.77 |
|---|---|---|---|---|---|---|---|---|---|---|---|---|---|---|---|---|---|---|---|---|
| Example (C-2) | 2.22 | 2.48 | 2.22 |      | 4.77 |      | 2.48 | 2.22 | 4.77 | 6.02 | 4.77 | 4.77 | 2.22 | 4.77 |      | 2.22 | 4.77 | 2.22 | 2.48 | 4.77 |
|               | 4.59 | 2.77 |      |      |      |      | 4.92 | 5.25 | 3.32 | 4.30 | 3.51 | 4.52 |      | 3.51 | 2.48 | 4.77 | 3.51 | 4.52 | 4.90 |      |
|               | 4.52 | 2.90 |      |      |      |      | 3.85 | 4.10 | 5.70 | 5.21 | 4.26 | 4.39 |      | 4.26 | 2.48 | 2.22 | 4.26 | 4.39 | 4.80 |      |
|               | 3.02 |      |      | 5.32 |      |      |      |      |      |      |      |      | 4.52 |      |      |      |      |      |      |      |
|               | 5.39 |      |      | 5.58 |      |      |      |      |      |      |      |      | 4.39 |      |      |      |      |      |      |      |
|               |      |      |      |      |      |      |      |      |      | 5.56 |      |      |      |      |      | 4.95 |      |      |      |      |
|               |      |      |      |      |      |      |      |      |      | 5.23 |      |      |      |      |      | 4.95 |      |      |      |      |

FIG. 31

| RU 1 | RU 2 | RU 3 | RU 4 | RU 5 | RU 6 | RU 7 | RU 8 | RU 9 | RU 10 | RU 11 | RU 12 | RU 13 | RU 14 | RU 15 | RU 16 | RU 17 | RU 18 |
|---|---|---|---|---|---|---|---|---|---|---|---|---|---|---|---|---|---|
| 2.22 | 2.48 | 2.22 | 2.22 | 2.22 | 4.77 | 4.77 | 4.77 | 4.77 | 4.77 | 4.77 | 2.22 | 2.48 | 2.22 | 2.22 | 2.48 | 2.22 | |
| 2.90 | 4.52 | 2.48 | 4.26 | 4.77 | 5.21 | 5.21 | 4.77 | 4.26 | 2.48 | 4.52 | 2.90 | | | | | | |
| 5.39 | 4.39 | 5.21 | 4.39 | 5.48 | 5.39 | | | | | | | | | | | | |
| 5.46 | 5.22 | | | | | | | | | | | | | | | | |

FIG. 32

| RU | Value 1 | Value 2 | Value 3 | Value 4 |
|---|---|---|---|---|
| RU 1 | 2.22 | 2.90 | 5.39 | 4.79 |
| RU 2 | 2.48 | 2.90 | 5.39 | 4.79 |
| RU 3 | 2.22 | 4.52 | 5.39 | 4.79 |
| RU 4 | 2.22 | 4.52 | 5.50 | 4.79 |
| RU 5 | 2.48 | 2.48 | 5.50 | 4.79 |
| RU 6 | 2.22 | 4.26 | 4.39 | 4.79 |
| RU 7 | 4.77 | 4.26 | 4.39 | 4.79 |
| RU 8 | 4.77 | 5.21 | 4.39 | 4.79 |
| RU 9 | 4.77 | 5.21 | 5.40 | 4.79 |
| RU 10 | 2.48 | 4.80 | 5.40 | 4.79 |
| RU 11 | 4.77 | 4.80 | 5.40 | 4.79 |
| RU 12 | 2.22 | 3.85 | 5.40 | 4.79 |
| RU 13 | 2.48 | 3.85 | 5.61 | 4.79 |
| RU 14 | 2.22 | 2.22 | 5.61 | 4.79 |
| RU 15 | 4.77 | 4.80 | 5.61 | 4.79 |
| RU 16 | 2.48 | 4.39 | 5.61 | 4.79 |
| RU 17 | 4.77 | 4.26 | 5.61 | 4.79 |
| RU 18 | 2.22 | 4.26 | 5.61 | 4.79 |

FIG. 33

| RU | Value |
|---|---|
| RU 20 | 2.22 |
| RU 21 | 4.77 |
| RU 22 | 2.48 |
| RU 23 | 4.77 |
| RU 24 | 2.22 |
| RU 25 | 2.48 |
| RU 26 | 2.22 |
| RU 27 | 4.77 |
| RU 28 | 2.48 |
| RU 29 | 4.77 |
| RU 30 | 4.77 |
| RU 31 | 4.77 |
| RU 32 | 2.22 |
| RU 33 | 2.48 |
| RU 34 | 2.22 |
| RU 35 | 2.22 |
| RU 36 | 2.48 |
| RU 37 | 2.22 |

Second level: 4.26, 4.80, 2.22, 3.85, 4.80, 5.21, 4.77, 4.26, 2.48, 4.52, 2.90

Third level: 4.39, 5.61, 5.40, 4.39, 5.50, 5.39

Fourth level: 4.79

METHOD AND APPARATUS FOR GENERATING TRAINING SIGNAL USING PREDETERMINED BINARY SEQUENCE IN WIRELESS LAN SYSTEM

CROSS-REFERENCE TO RELATED APPLICATIONS

This application is a continuation of U.S. application Ser. No. 18/101,005, filed on Jan. 24, 2023, which is a continuation of U.S. application Ser. No. 17/159,865, filed on Jan. 27, 2021, now U.S. Pat. No. 11,582,695, which is a continuation of U.S. application Ser. No. 16/870,328, filed on May 8, 2020, now U.S. Pat. No. 10,939,377, which is a continuation of U.S. application Ser. No. 16/248,681, filed on Jan. 15, 2019, now U.S. Pat. No. 10,791,519, which is a continuation of U.S. application Ser. No. 15/517,434, filed on Apr. 6, 2017, now U.S. Pat. No. 10,257,784, which is a National Stage filing under 35 U.S.C. 371 of International Application No. PCT/KR2016/008629, filed on Aug. 5, 2016, which claims the benefit of U.S. Provisional Applications No. 62/201,586 filed on Aug. 6, 2015, No. 62/202,124 filed on Aug. 6, 2015, No. 62/202,165 filed on Aug. 7, 2015, and No. 62/313,112 filed on Mar. 24, 2016, the contents of which are all hereby incorporated by reference herein in their entirety.

BACKGROUND OF THE INVENTION

Field of the Invention

This specification relates to a method for generating a sequence for a training field in a wireless LAN system and, most particularly, to a method and apparatus for generating a short training field (STF) sequence that can be used in multiple bands in a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

This specification proposes a method and apparatus for configuring a sequence that is used for a training field in a wireless LAN system.

An example of this specification proposes a solution for enhancing the problems in the sequence for the STF field that is presented in the related art.

Technical Solutions

An example of this specification proposes a transmission method that can be applied to a wireless LAN system and, most particularly, to a method and apparatus for configuring a STF signal supporting at least any one of multiple frequency bands supported by the wireless LAN system.

A transmitting apparatus according to the example of the present invention generates a short training field (STF) signal corresponding to the first frequency band and transmits a physical protocol data unit (PPDU) including the STF signal.

The STF signal corresponding to the first frequency band may be generated based on a sequence in which a predetermined M sequence is repeated.

The repeated sequence may be defined as $\{M, -1, -M\ 0, M, -1, M\}*(1+j)/sqrt(2)$.

The predetermined M sequence may correspond to a binary sequence having a length of 15 bits. In this case, the M sequence may correspond to $M=\{-1, -1, -1, 1, 1, 1, -1, 1, 1, 1, -1, 1, 1, -1, 1\}$.

Effects of the Invention

According to an example of this specification, a method for generating a STF signal that can be used in the wireless LAN system is proposed herein.

The method for generating a STF signal that is proposed in the example of this specification resolves the problems presented in the related art.

BRIEF DESCRIPTION OF THE DRAWINGS

FIG. 1 is a conceptual view illustrating the structure of a wireless local area network (WLAN).

FIG. 2 is a diagram illustrating an example of a PPDU used in an IEEE standard.

FIG. 16 is an example specifying the repeated structure of FIG. 15 in more detail.

FIG. 18 is an example specifying the repeated structure of FIG. 17 in more detail.

FIG. 20 is a drawing indicating the above-described examples of the PAPR in RU units that are used in a 40 MHz band.

FIG. 21 is a drawing indicating the above-described examples of the PAPR in RU units that are used in a left side band of a 80 MHz band.

FIG. 22 is a drawing indicating the above-described examples of the PAPR in RU units that are used in a right side band of a 80 MHz band.

FIG. 24 is an example specifying the repeated structure of FIG. 23 in more detail.

FIG. 25 is a drawing indicating the above-described examples of the PAPR in RU units that are used in a 20 MHz band.

FIG. 26 is a drawing indicating the above-described examples of the PAPR in RU units that are used in a 40 MHz band.

FIG. 27 is a drawing indicating the above-described examples of the PAPR in RU units that are used in a left side band of a 80 MHz band.

FIG. 28 is a drawing indicating the above-described examples of the PAPR in RU units that are used in a right side band of a 80 MHz band.

FIG. 31 is a drawing showing a PAPR for RUs that are used in a 40 MHz band.

FIG. 32 and FIG. 33 are drawings respectively showing a PAPR for RUs that are used in a 80 MHz band.

DESCRIPTION OF EXEMPLARY EMBODIMENTS

Figure 3:
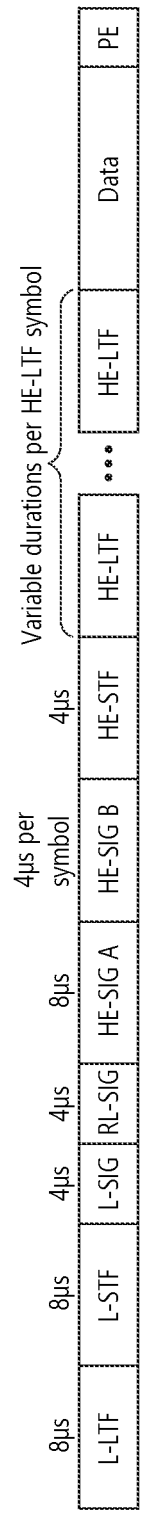
FIG. 3 is a diagram illustrating an example of an HE PDDU.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in diverse meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 ys).

More detailed description of the respective fields of FIG. 3 will be made below.

Figure 4:
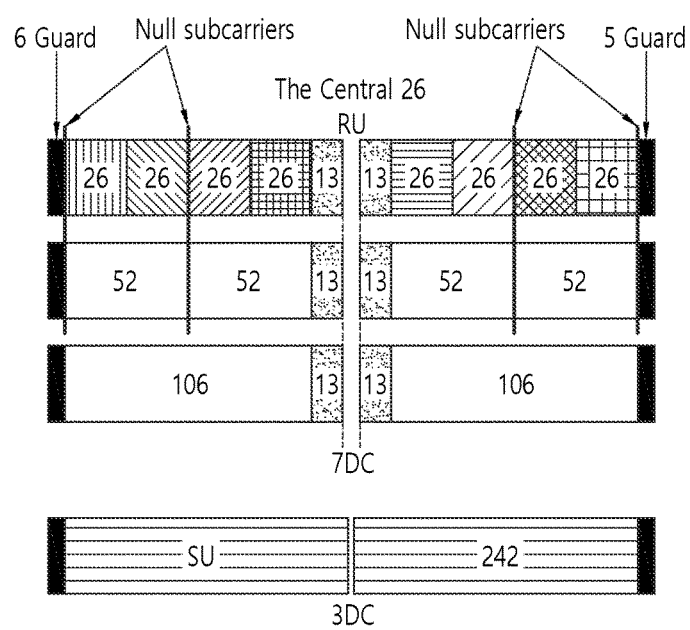
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
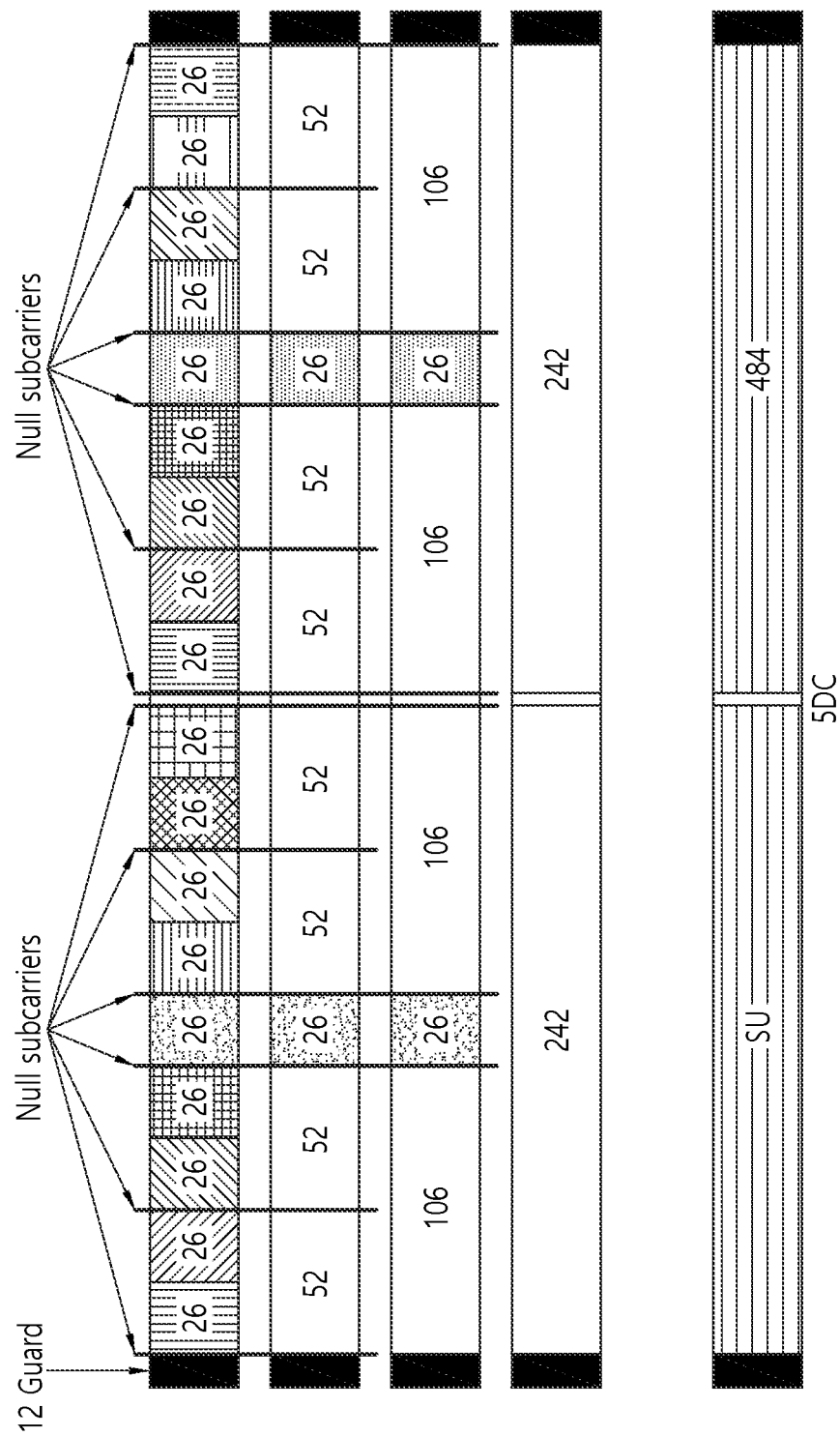
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
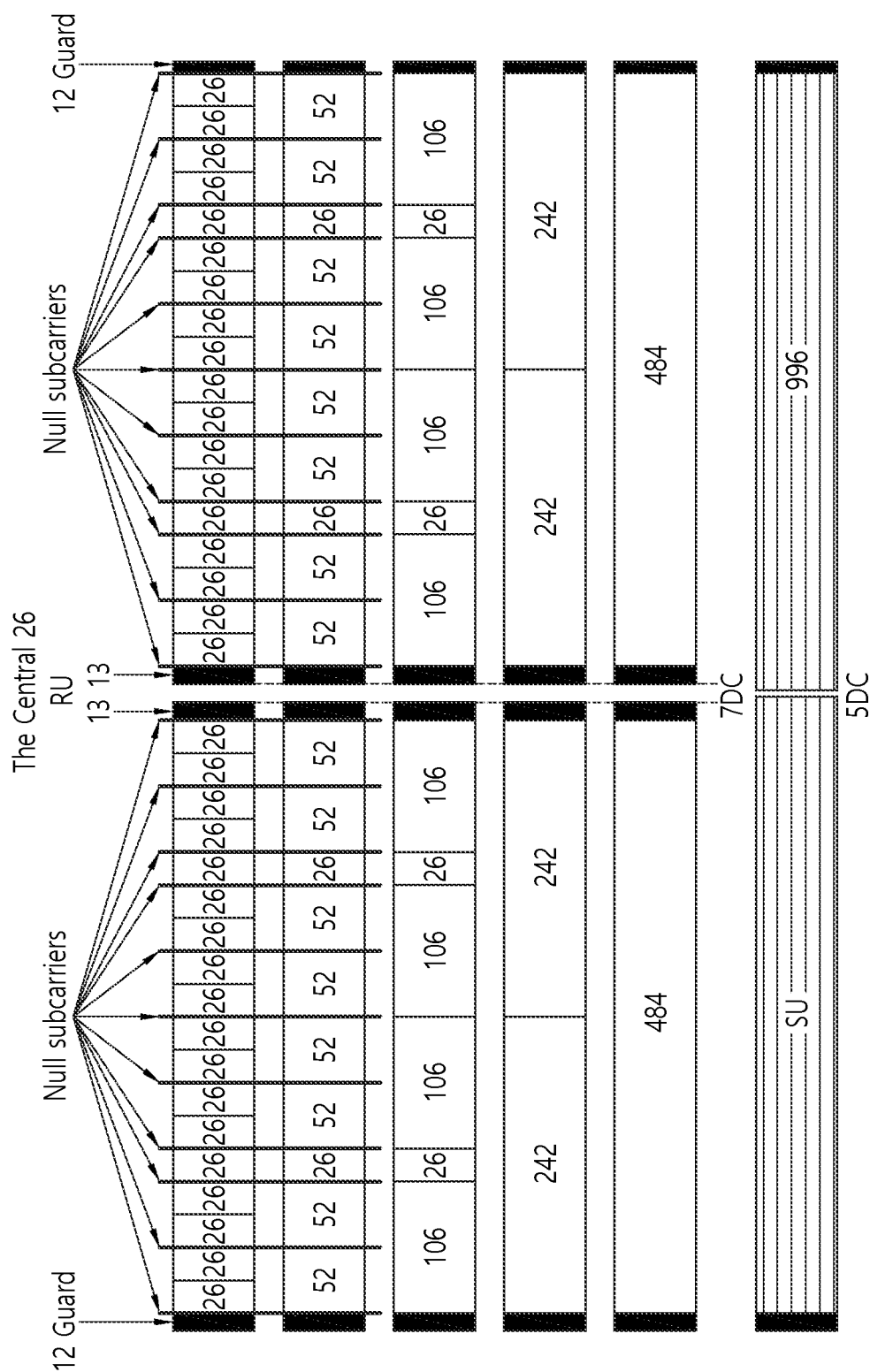
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
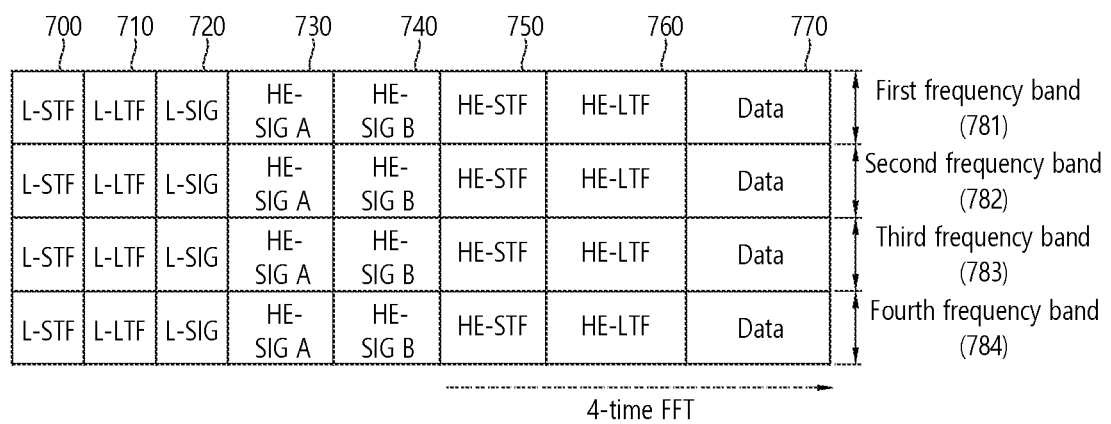
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
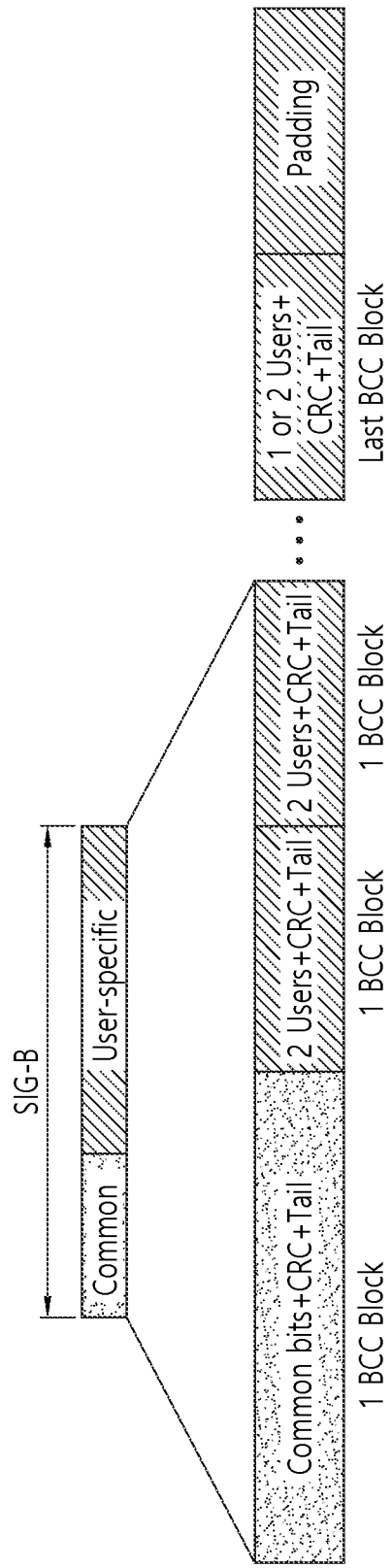
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N(=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

The characteristic that the size of the FFT/IFFT being applied to the HE-STF 750 and the fields after the HE-STF 750 can be diversely configured may be applied to a downlink PPDU and/or an uplink PPDU. More specifically, such characteristic may be applied to the PPDU shown in FIG. 7 or to an uplink MU PPDU, which will be described later on.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
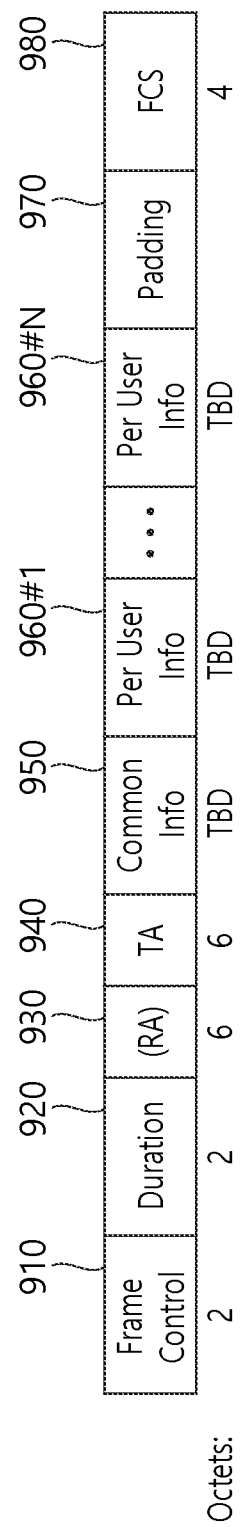
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

Additionally, a RA field 930 may include address information of a receiving STA of the corresponding trigger frame, and this field may also be omitted as required. A TA field 940 may include address information of the STA (e.g., AP) transmitting the corresponding trigger frame, and a common information field 950 may include common control information that is applied to the receiving STA receiving the corresponding trigger frame.

Figure 10:
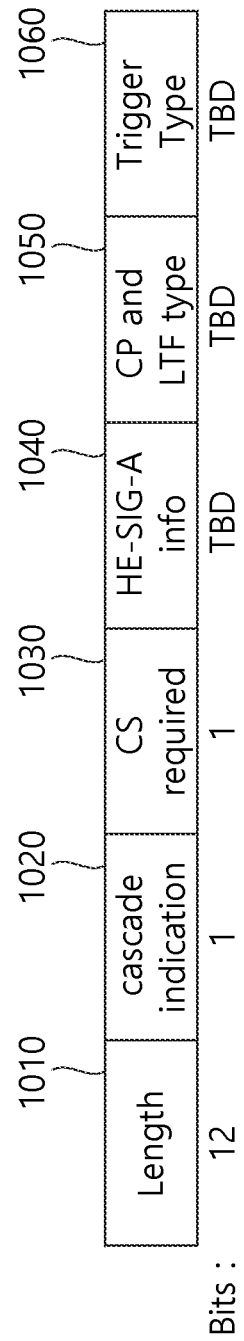
FIG. 10 illustrates an example of a common information field.

FIG. 10 illustrates an example of a common information field. Among the sub-fields of FIG. 10, some may be omitted, and other additional sub-fields may also be added. Additionally, the length of each of the sub-fields shown in the drawing may be varied.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Meanwhile, the remaining description on FIG. 9 will be additionally provided as described below.

It is preferable that the trigger frame includes per user information fields 960 #1 to 960 #N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960 #1 to 960 #N shown in FIG. 9 further includes multiple sub-fields.

Figure 11:
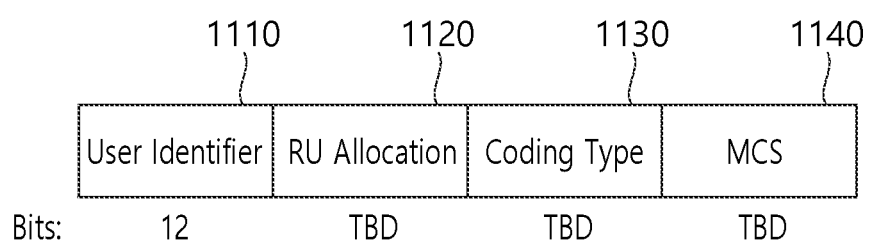
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

Additionally, a RU Allocation field 1120 may be included in the sub-field of the per user information field. More specifically, in case a receiving STA, which is identified by the User Identifier field 1110, transmits an uplink PPDU in response to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Figure 12:
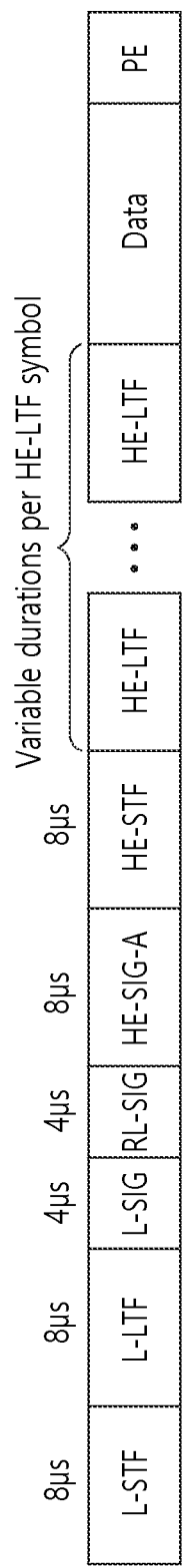
FIG. 12 is a block diagram illustrating an example of an uplink MU PPDU.

FIG. 12 is a block diagram illustrating an example of an uplink MU PPDU. The uplink MU PPDU of FIG. 12 may be transmitted in response to the above-described trigger frame.

As shown in the drawing, the PPDU of FIG. 12 includes diverse fields, and the fields included herein respectively correspond to the fields shown in FIG. 2, FIG. 3, and FIG. 7.

Meanwhile, as shown in the drawing, the uplink PPDU of FIG. 12 may not include a HE-SIG-B field and may only include a HE-SIG-A field.

Figure 13:
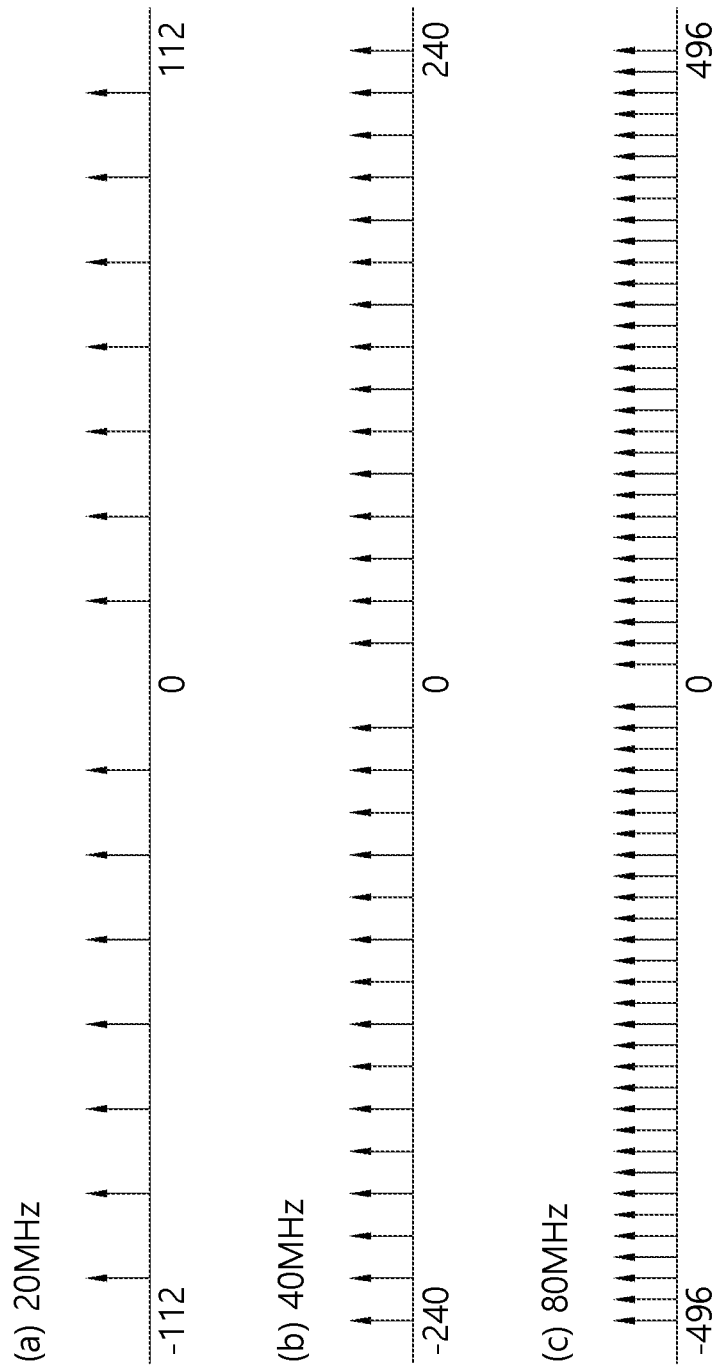
FIG. 13 illustrates a 1×HE-STF tone in a per-channel PPDU transmission according to an exemplary embodiment of the present invention.

FIG. 13 illustrates a 1×HE-STF tone in a per-channel PPDU transmission according to an exemplary embodiment of the present invention. Most particularly, FIG. 13 shows an example of a HE-STF tone (i.e., 16-tone sampling) having a periodicity of 0.8 μs in 20 MHz/40 MHz/80 MHz bandwidths. Accordingly, in FIG. 13, the HE-STF tones for each bandwidth (or channel) may be positioned at 16 tone intervals.

In FIG. 13, the x-axis represents the frequency domain. The numbers on the x-axis represent the indexes of a tone, and the arrows represent mapping of a value that is not equal to 0 (i.e., a non-zero value) to the corresponding tone index.

Sub-drawing (a) of FIG. 13 illustrates an example of a 1×HE-STF tone in a 20 MHz PPDU transmission.

Referring to sub-drawing (a), in case a HE-STF sequence (i.e., 1×HE-STF sequence) for a periodicity of 0.8 μs is mapped to tones of a 20 MHz channel, the 1×HE-STF sequence is mapped to tones having tone indexes that are divisible by 16 (i.e., multiples of 16), among the tones having tone indexes ranging from −112 to 112, and, then, 0 may be mapped to the remaining tones. More specifically, in a 20 MHz channel, among the tones having tone indexes ranging from −112 to 112, a 1×HE-STF tone may be positioned at a tone index that is divisible by 16 excluding the DC. Accordingly, a total of 14 1×HE-STF tones having the 1×HE-STF sequence mapped thereto may exist in the 20 MHz channel.

Sub-drawing (b) of FIG. 13 illustrates an example of a 1×HE-STF tone in a 40 MHz PPDU transmission.

Referring to sub-drawing (b), in case a HE-STF sequence (i.e., 1×HE-STF sequence) for a periodicity of 0.8 μs is mapped to tones of a 40 MHz channel, the 1×HE-STF sequence is mapped to tones having tone indexes that are divisible by 16 (i.e., multiples of 16), among the tones having tone indexes ranging from −240 to 240, and, then, 0 may be mapped to the remaining tones. More specifically, in a 40 MHz channel, among the tones having tone indexes ranging from −240 to 240, a 1×HE-STF tone may be positioned at a tone index that is divisible by 16 excluding the DC. Accordingly, a total of 30 1×HE-STF tones having the 1×HE-STF sequence mapped thereto may exist in the 40 MHz channel.

Sub-drawing (c) of FIG. 13 illustrates an example of a 1×HE-STF tone in an 80 MHz PPDU transmission.

Referring to sub-drawing (c), in case a HE-STF sequence (i.e., 1×HE-STF sequence) for a periodicity of 0.8 μs is mapped to tones of a 80 MHz channel, the 1×HE-STF sequence is mapped to tones having tone indexes that are divisible by 16 (i.e., multiples of 16), among the tones having tone indexes ranging from −496 to 496, and, then, 0 may be mapped to the remaining tones. More specifically, in an 80 MHz channel, among the tones having tone indexes ranging from −496 to 496, a 1×HE-STF tone may be positioned at a tone index that is divisible by 16 excluding the DC. Accordingly, a total of 62 1×HE-STF tones having the 1×HE-STF sequence mapped thereto may exist in the 80 MHz channel.

Figure 14:
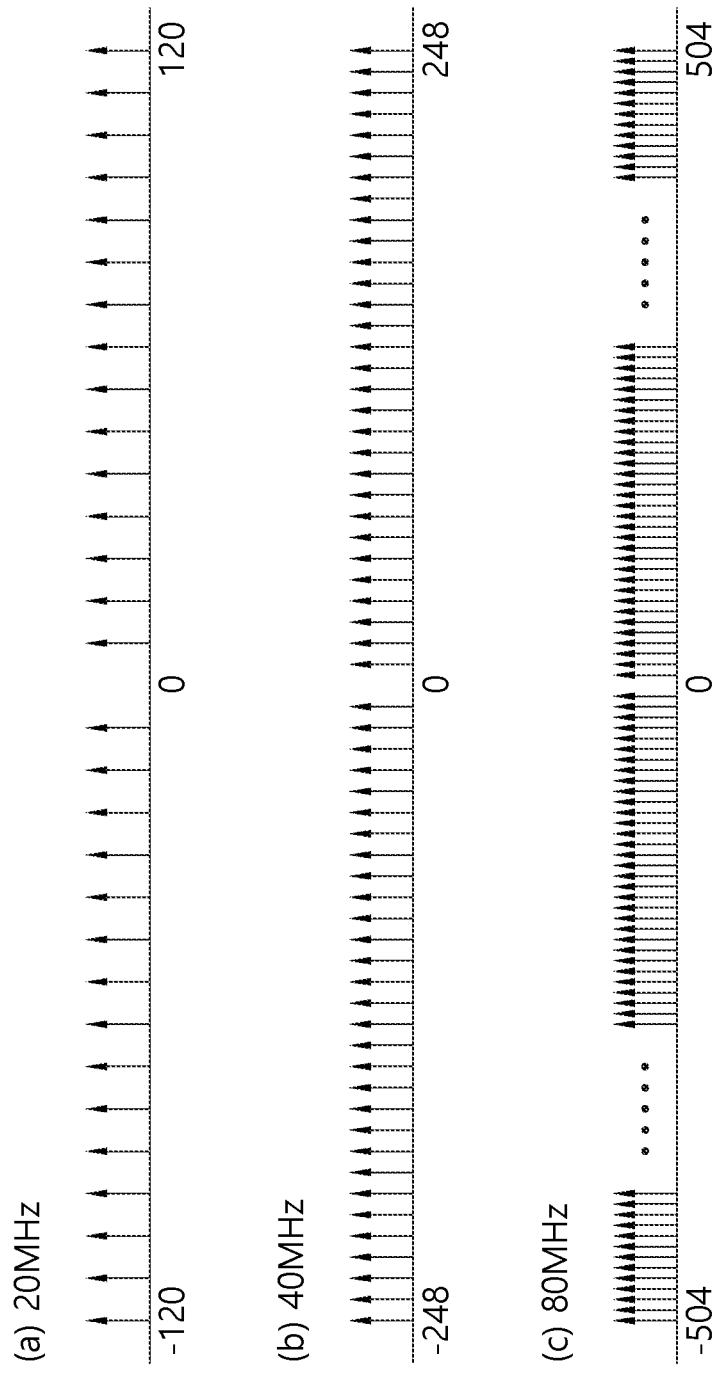
FIG. 14 illustrates a 2×HE-STF tone in a per-channel PPDU transmission according to an exemplary embodiment of the present invention.

FIG. 14 illustrates a 2×HE-STF tone in a per-channel PPDU transmission according to an exemplary embodiment of the present invention. Most particularly, FIG. 14 shows an example of a HE-STF tone (i.e., 8-tone sampling) having a periodicity of 1.6 μs in 20 MHz/40 MHz/80 MHz bandwidths. Accordingly, in FIG. 14, the HE-STF tones for each bandwidth (or channel) may be positioned at 8 tone intervals.

The 2×HE-STF signal according to FIG. 14 may be applied to the uplink MU PPDU shown in FIG. 12. More specifically, the 2×HE-STF signal shown in FIG. 14 may be included in the PPDU, which is transmitted via uplink in response to the above-described trigger frame.

In FIG. 14, the x-axis represents the frequency domain. The numbers on the x-axis represent the indexes of a tone, and the arrows represent mapping of a value that is not equal to 0 (i.e., a non-zero value) to the corresponding tone index.

Sub-drawing (a) of FIG. 14 is a drawing showing an example of a 2×HE-STF tone in a 20 MHz PPDU transmission.

Referring to sub-drawing (a), in case a HE-STF sequence (i.e., 2×HE-STF sequence) for a periodicity of 1.6 μs is mapped to tones of a 20 MHz channel, the 2×HE-STF sequence is mapped to tones having tone indexes that are divisible by 8 (i.e., multiples of 8), among the tones having tone indexes ranging from −120 to 120, and, then, 0 may be mapped to the remaining tones. More specifically, in a 20 MHz channel, among the tones having tone indexes ranging from −120 to 120, a 2×HE-STF tone may be positioned at a tone index that is divisible by 8 excluding the DC. Accordingly, a total of 30 2×HE-STF tones having the 2×HE-STF sequence mapped thereto may exist in the 20 MHz channel.

Sub-drawing (b) of FIG. 14 illustrates an example of a 2×HE-STF tone in a 40 MHz PPDU transmission.

Referring to sub-drawing (b), in case a HE-STF sequence (i.e., 2×HE-STF sequence) for a periodicity of 1.6 μs is mapped to tones of a 40 MHz channel, the 2×HE-STF sequence is mapped to tones having tone indexes that are divisible by 8 (i.e., multiples of 8), among the tones having tone indexes ranging from −248 to 248, and, then, 0 may be mapped to the remaining tones. More specifically, in a 40 MHz channel, among the tones having tone indexes ranging from −248 to 248, a 2×HE-STF tone may be positioned at a tone index that is divisible by 8 excluding the DC. Herein, however, tones having tone indexes of 248 correspond to guard tones (left and right guard tones), and such guard tones may be processed with nulling (i.e., such guard tones may have a value of 0). Accordingly, a total of 60 2×HE-STF tones having the 2× HE-STF sequence mapped thereto may exist in the 40 MHz channel.

Sub-drawing (c) of FIG. 14 illustrates an example of a 2×HE-STF tone in an 80 MHz PPDU transmission.

Referring to sub-drawing (c), in case a HE-STF sequence (i.e., 2×HE-STF sequence) for a periodicity of 1.6 μs is mapped to tones of an 80 MHz channel, the 2×HE-STF sequence is mapped to tones having tone indexes that are divisible by 8 (i.e., multiples of 8), among the tones having tone indexes ranging from −504 to 504, and, then, 0 may be mapped to the remaining tones. More specifically, in an 80 MHz channel, among the tones having tone indexes ranging from −504 to 504, a 2×HE-STF tone may be positioned at a tone index that is divisible by 8 excluding the DC. Herein, however, tones having tone indexes of 504 correspond to guard tones (left and right guard tones), and such guard tones may be processed with nulling (i.e., such guard tones may have a value of 0). Accordingly, a total of 124 2×HE-STF tones having the 2×HE-STF sequence mapped thereto may exist in the 80 MHz channel.

Hereinafter, a sequence that can be applied to a 1×HE-STF tone (i.e., sampling at intervals of 16 tones) and a sequence that can be applied to a 2×HE-STF tone (i.e., sampling at intervals of 8 tones) will be proposed. More specifically, a basic sequence is configured, and a new sequence structure having excellent extendibility by using a nested structure in which a conventional sequence is used as a parts of a new sequence is proposed. It is preferable that the M sequence that is used in the following example corresponds to a sequence having a length of 15. It is preferable that the M sequence is configured as a binary sequence so as to decrease the level of complexity when being decoded.

Hereinafter, in a state when a detailed example of an M sequence is not proposed, a basic procedure for generating a sequence in various bandwidths will be described in detail.

Example (A): Example of a 1×HE-STF Tone

The example of the exemplary embodiment, which will hereinafter be described in detail, may generate an STF sequence supporting diverse frequency bandwidths by using a method of repeating the M sequence, which corresponds to a binary sequence.

Figure 15:
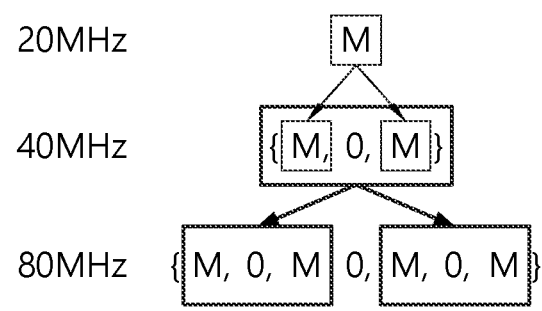
FIG. 15 illustrates an example of repeating an M sequence.

FIG. 15 illustrates an example of repeating an M sequence.

It is preferable that the example shown in FIG. 15 is applied to 1×HE-STF.

As shown in FIG. 15, when expressed in the form of an equation, the STF sequence for 20 MHz may be expressed as shown in Equation 1.

HE_STF_20 MHz(−112:16:+112)={$M$}

HE_STF_20 MHz(0)=0          <Equation 1>

The notation of HE_STF(A1:A2:A3)={$M$}, which is used in Equation 1 and the other equations shown below is as described below. First of all, the value of A1 corresponds to a frequency tone index corresponding to the first element of the M sequence, and the value of A3 corresponds to a frequency tone index corresponding to the last element of the M sequence. The value of A2 corresponds to an interval of frequency tone indexes corresponding to each element of the M sequence being positioned based on the frequency tone interval.

Accordingly, in Equation 1, the first element of the M sequence corresponds to the frequency band corresponding to index "−112", the last element of the M sequence corresponds to the frequency band corresponding to index "+112", and each element of the M sequence is positioned at 16 frequency tone intervals. Additionally, the value "0" corresponds to a frequency band corresponding to index "0" More specifically, Equation 1 has a structure corresponding to sub-drawing (a) of FIG. 13.

As shown in FIG. 15, when expressed in the form of an equation, the STF sequence for 40 MHz may be expressed as shown in Equation 2. More specifically, in order to extend the structure of Equation 1 to the 40 MHz band, {$M$, 0, $M$} may be used.

HE_STF_40 MHz(−240:16:240)={$M$, 0, $M$}     <Equation 2>

Equation 2 corresponds to a structure, wherein 15 M sequence elements are positioned within a frequency band range starting from a frequency band corresponding to index "−240" and up to a frequency band corresponding to index "−16" at 16 frequency tone intervals, wherein "0" is positioned for frequency index 0, and wherein 15 M sequence elements are positioned within a frequency band range starting from a frequency band corresponding to index "+16" and up to a frequency band corresponding to index "+240" at 16 frequency tone intervals "+16".

As shown in FIG. 15, when expressed in the form of an equation, the STF sequence for 80 MHz may be expressed as shown in Equation 3. More specifically, in order to extend the structure of Equation 1 to an 80 MHz band, {$M$, 0, $M$, 0, $M$, 0, $M$} may be used.

HE_STF_80 MHz(−496:16:496)={$M$, 0, $M$, 0, $M$, 0, $M$}     <Equation 3>

Equation 3 corresponds to a structure, wherein 15 M sequence elements are positioned within a frequency band range starting from a frequency band corresponding to index "−496" and up to a frequency band corresponding to index "−272" at 16 frequency tone intervals, wherein "0" (or an arbitrary additional value a1) is positioned for a frequency band corresponding to index "−256", wherein 15 M sequence elements are positioned within a frequency band range starting from a frequency band corresponding to index "−240" and up to a frequency band corresponding to index "−16" at 16 frequency tone intervals, and wherein "0" is positioned for frequency index 0. Additionally, Equation 3 also corresponds to a structure, wherein 15 M sequence elements are positioned within a frequency band range starting from a frequency band corresponding to index "+16" and up to a frequency band corresponding to index "+240" at 16 frequency tone intervals, wherein "0" (or an arbitrary additional value a2) is positioned for a frequency band corresponding to index "+256", and wherein M sequence elements are positioned from "+272" to "+496" at 16 frequency tone intervals.

By applying an additional coefficient to the above-described structures of Equation 1 to Equation 3, it will be possible to optimize the sequence for PAPR. In case of the related art IEEE 802.11ac system, although it may be possible to extend the predetermined 20 MHz sequence for the 40 MHz and 80 MHz by using a gamma value, since the gamma value may not be applied in the IEEE 802.11ax or HEW system, the PAPR should be considered without considering the gamma value. Additionally, in case of considering the 1×HE-STF sequence, as shown in Equation 1 to Equation 3, the PAPR should be calculated based on the entire band (e.g., the entire band shown in FIG. 4 to FIG. 6), and, in case of considering the 2×HE-STF sequence, the PAPR should be calculated while considering each unit (e.g., individual units 26-RU, 52-RU, 106-RU, and so on, shown in FIG. 4 to FIG. 6).

FIG. 16 is an example specifying the repeated structure of FIG. 15 in more detail.

As shown in the drawing, coefficients c1 to c7 may be applied, or $(1+j)*\text{sqrt}(1/2)$ may be applied, and additional values, such as a1 and a2, may also be applied.

Based on the content of FIG. 16, an example of the STF sequence that is optimized for the PAPR is as shown below.

First of all, the M sequence may be determined as shown below in Equation 4.

$M$={−1, 1, −1, 1, −1, −1, 1, 1, −1, −1, 1, 1, 1, 1, 1}     <Equation 4>

In this case, the STF sequence respective to the 20 MHz and 40 MHz bands may be determined in accordance with the equations shown below.

HE_STF_20 MHz(−112:16:112)=$M*(1+j)/\text{sqrt}(2)$

HE_STF_20 MHz(0)=0          <Equation 5>

HE_STF_40 MHz(−240:16:240)={$M$, 0, −$M$}*$(1+j)/\text{sqrt}(2)$     <Equation 6>

The definition of the variables used in the equations presented above is the same as those used in Equation 1 to Equation 3.

Meanwhile, the STF sequence corresponding to the 80 MHz band may be determined in accordance with any one of the equations shown below.

HE_STF_80 MHz(−496:16:496)={$M$, 1, −$M$ 0, −$M$,
1, −$M$}*(1+$j$)/sqrt(2)   <Equation 7>

HE_STF_80 MHz(−496:16:496)={$M$, −1, $M$ 0, $M$,
−1, −$M$}*(1+$j$)/sqrt(2)   <Equation 8>

The definition of the variables used in the equations presented above is the same as those used in Equation 1 to Equation 3.

The examples shown in Equation 4 to Equation 8, which are presented above, may be modified to other examples, as shown below.

First of all, the M sequence that is basically used may be modified as shown in Equation 9.

$M$={−1, −1, −1, 1, 1, 1, −1, 1, 1, 1, −1, 1, 1, −1, 1}   <Equation 9>

Equation 9 that is presented above may be applied to all or part of Equation 5 to Equation 8. For example, it may be possible to use the basic sequence of Equation 9 based on the structure of Equation 7.

The PAPR for the examples presented in the above-described equations may be calculated as shown below. As described above, in case of considering the 1×HE-STF sequence, the PAPR is calculated based on the entire band (e.g., the entire band shown in FIG. 4 to FIG. 6).

More specifically, the PAPR for the example of applying Equation 4 to the structure of Equation 5 is equal to 2.33, the PAPR for the example of applying Equation 4 to the structure of Equation 6 is equal to 4.40, and the PAPR for the example of applying Equation 4 to the structure of Equation 7 or Equation 8 is equal to 4.49. Additionally, the PAPR for the example of applying Equation 9 to the structure of Equation 5 is equal to 1.89, the PAPR for the example of applying Equation 9 to the structure of Equation 6 is equal to 4.40, and the PAPR for the example of applying Equation 9 to the structure of Equation 7 or Equation 8 is equal to 4.53. Although the STF sequences that are presented above show minute differences in the capability of the PAPR, since the corresponding STF sequences present enhanced PAPR capability as compared to the related art sequences, it will be preferable to used any one of the examples presented above for uplink and/or downlink communication.

Example (B): Example of a 2×HE-STF Tone

It is preferable to apply the example of the exemplary embodiment, which will hereinafter be described in detail, to 2×HE-STF.

Figure 17:
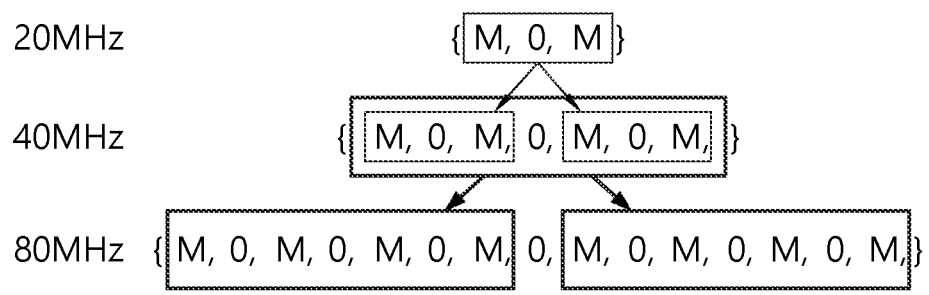
FIG. 17 illustrates an example of repeating an M sequence.

FIG. 17 illustrates an example of repeating an M sequence.

As shown in FIG. 17, when expressed in the form of an equation, the STF sequence for 20 MHz may be expressed as shown below in the following Equation.

HE_STF_20 MHz(−120:8:+120)={$M$, 0, $M$}   <Equation 10>

As shown in FIG. 17, when expressed in the form of an equation, the STF sequence for 40 MHz may be expressed as shown below in the following Equation.

HE_STF_40 MHz(−248:8:248)={$M$, 0, $M$, 0, $M$, 0, $M$}   <Equation 11>

As shown in FIG. 17, when expressed in the form of an equation, the STF sequence for 80 MHz may be expressed as shown below in the following Equation.

HE_STF_80 MHz(−504:8:504)={$M$, 0, $M$, 0, $M$, 0, $M$, 0, $M$, 0, $M$, 0, $M$}   <Equation 12>

By applying an additional coefficient to the above-described structures of Equation 10 to Equation 12, it will be possible to optimize the sequence for PAPR. In case of the related art IEEE 802.11ac system, although it may be possible to extend the predetermined 20 MHz sequence for the 40 MHz and 80 MHz by using a gamma value, since the gamma value may not be applied in the IEEE 802.11ax or HEW system, the PAPR should be considered without considering the gamma value.

FIG. 18 is an example specifying the repeated structure of FIG. 17 in more detail.

As shown in the drawing, coefficients c1 to c14 may be applied, or (1+j)*sqrt(½) may be applied, and additional values, such as a1 to a8, may also be applied.

Based on the content of FIG. 18, an example of the STF sequence that is optimized for the PAPR is as shown below.

First of all, the M sequence may be determined as shown below in Equation 13.

$M$={−1, 1, −1, 1, −1, −1, 1, 1, −1, −1, 1, 1, 1, 1}   <Equation 13>

In this case, the STF sequence respective to the 20 MHz, 40 MHz, and 80 MHz bands may be determined in accordance with the equations shown below.

HE_STF_20 MHz(−120:8:120)={$M$, 0, −$M$}*(1+$j$)/sqrt(2)   <Equation 14>

HE_STF_40 MHz(−248:8:248)={$M$, 1, −$M$, 0, −$M$, 1, $M$}*(1+$j$)/sqrt(2)

HE_STF_40 MHz(±248)=0   <Equation 15>

HE_STF_80 MHz(−504:8:504)={$M$, −1, $M$, −1, $M$, −1, −$M$, 0, $M$, 1, −$M$, 1, $M$, 1, $M$}*(1+$j$)/sqrt(2)

HE_STF_80 MHz(±504)=0   <Equation 16>

The definition of the variables used in the equations presented above is the same as those used in Equation 1 to Equation 3.

The examples shown in Equation 14 to Equation 16, which are presented above, may be modified to other examples, as shown below.

First of all, the M sequence that is basically used may be modified as shown in Equation 17.

$M$={−1, −1, −1, 1, 1, 1, −1, 1, 1, 1, −1, 1, 1, −1, 1}   <Equation 17>

The 2×HE-STF sequence for the 20 MHz band may be generated by using a method of applying Equation 17, which is presented above, to Equation 14.

Meanwhile, 2×HE-STF sequence for the 40 MHz band may be generated by using a method of applying Equation 17, which is presented above, to the Equation shown below.

HE_STF_40 MHz(−248:8:248)={$M$, −1, −$M$, 0, $M$, −1, $M$}*(1+$j$)/sqrt(2)

HE_STF_40 MHz(±248)=0   <Equation 18>

Additionally, 2×HE-STF sequence for the 80 MHz band may be generated by using a method of applying Equation 17, which is presented above, to the Equation shown below.

HE_STF_80 MHz(−504:8:504)={$M$, −1, $M$, −1, −$M$, −1, $M$, 0, −$M$, 1, $M$, 1, −$M$, 1, −$M$}*(1+$j$)/sqrt(2)

HE_STF_80 MHz(±504)=0   <Equation 19>

Figure 19:
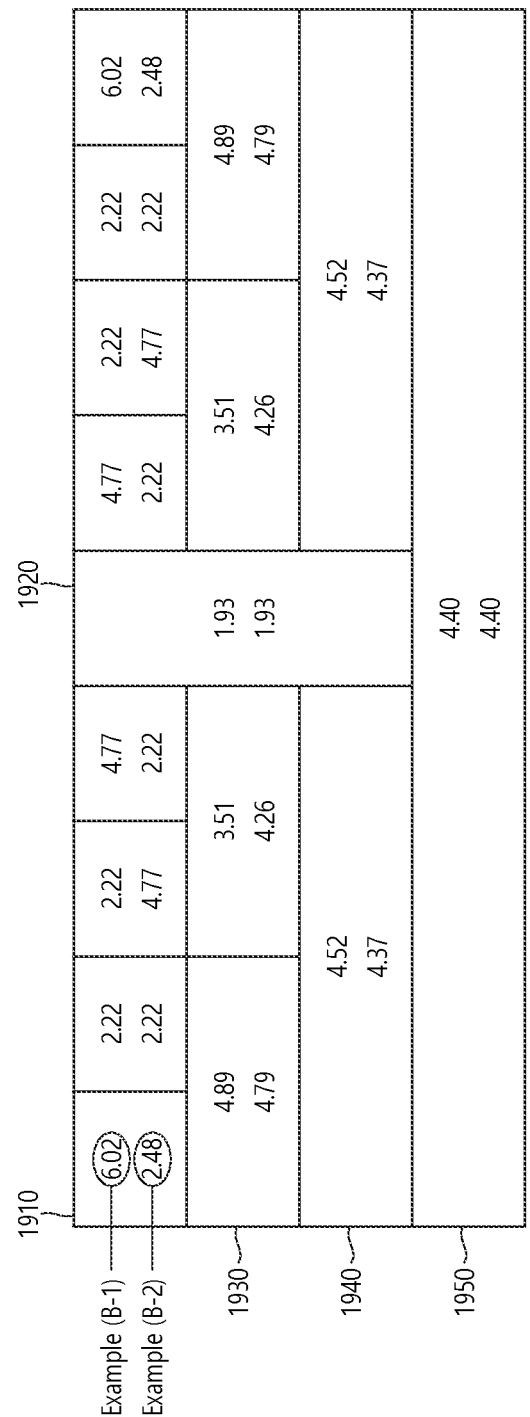
FIG. 19 is a drawing indicating the above-described examples of the PAPR in RU units that are used in a 20 MHz band.

FIG. 19 is a drawing indicating the above-described examples of the PAPR in RU units that are used in a 20 MHz band.

Each block shown in FIG. 19 respectively indicates 26-RU, 52-RU, 106-RU, and 242-RU, which are shown in FIG. 4. For example, a first block 1910 indicates a leftmost 26-RU, which is shown in FIG. 4, a second block 1920 indicates a central 26-RU, which is shown in FIG. 4, a third block 1930 indicates a 52-RU, a fourth block 1940 indicates a 106-RU, and a fifth block 1950 indicates a 242-RU.

The example of the above-described Equation 13 to Equation 16 may be indicated as example (B-1), and the example of the above-described Equation 17 to Equation 19 may be indicated as example (B-2). In this case, the values indicated in each block represent the PAPRs for example (B-1) and example (B-2), respectively.

FIG. 20 is a drawing indicating the above-described examples of the PAPR in RU units that are used in a 40 MHz band. More specifically, each block shown in FIG. 20 respectively indicates 26-RU, 52-RU, 106-RU, 242-RU, and 484-RU, which are shown in FIG. 5.

Figure 22:
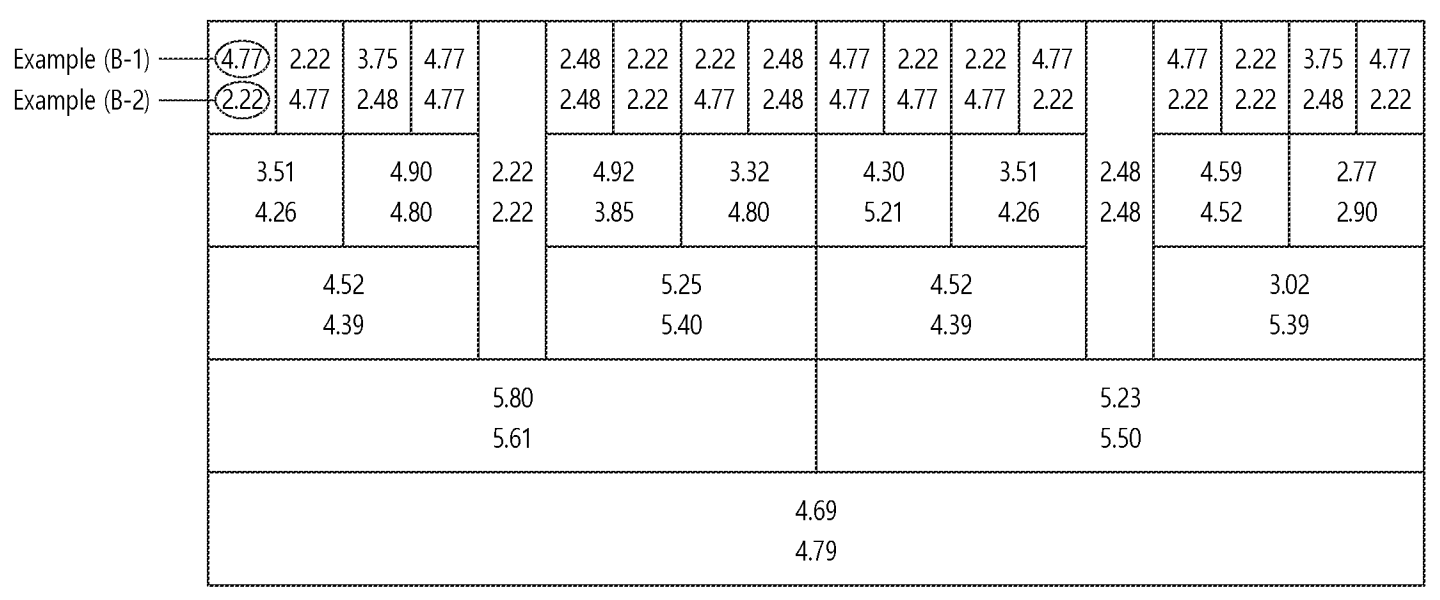

FIG. 21 is a drawing indicating the above-described examples of the PAPR in RU units that are used in a left side band of a 80 MHz band. And, FIG. 22 is a drawing indicating the above-described examples of the PAPR in RU units that are used in a right side band of a 80 MHz band. More specifically, each block shown in FIG. 21 and FIG. 22 respectively indicates 26-RU, 52-RU, 106-RU, 242-RU, 484-RU, and 996-RU, which are shown in FIG. 6. In the examples shown in FIG. 21 and FIG. 22, in case of the 26-RU (i.e., central 26-RU) that is positioned in the DC band, the PAPR of example (B-1) is equal to 1.94, and the PAPR of example (B-2) is equal to 1.94. Additionally, for the entire band, the PAPR of example (B-1) is equal to 4.97, and the PAPR of example (B-2) is equal to 5.77.

Example (C): Example of a 2×HE-STF Tone

In case of the 2×HE-STF according to the above-described example (B), due to a collision with a guard band in the 40 MHz band and the 80 MHz band, nulling is required in the tone index "±248" and the tone index "±504". The following example (C) proposes a STF sequence that does not require any nulling to be performed.

Figure 23:
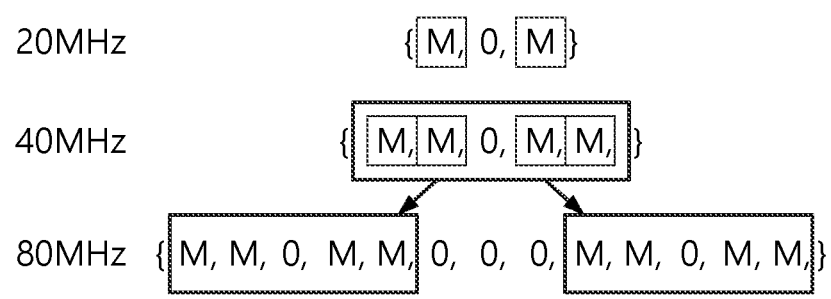
FIG. 23 illustrates an example of repeating an M sequence.

FIG. 23 illustrates an example of repeating an M sequence.

As shown in FIG. 23, when expressed in the form of an equation, the STF sequence for 20 MHz may be expressed as shown below in the following Equation.

$$\text{HE\_STF\_20 MHz}(-120:8:+120) = \{M, 0, M\} \quad \text{<Equation 20>}$$

As shown in FIG. 23, when expressed in the form of an equation, the STF sequence for 40 MHz may be expressed as shown below in the following Equation.

$$\text{HE\_STF\_40 MHz}(-240:8:240) = \{M, M, 0, M, M\} \quad \text{<Equation 21>}$$

As shown in FIG. 23, when expressed in the form of an equation, the STF sequence for 80 MHz may be expressed as shown below in the following Equation.

$$\text{HE\_STF\_80 MHz}(-496:8:496) = \{M, M, 0, M, M, 0, M, M, 0, M, M\} \quad \text{<Equation 22>}$$

By applying an additional coefficient to the above-described structures of Equation 20 to Equation 22, it will be possible to optimize the sequence for PAPR. In case of the related art IEEE 802.11ac system, although it may be possible to extend the predetermined 20 MHz sequence for the 40 MHz and 80 MHz by using a gamma value, since the gamma value may not be applied in the IEEE 802.11ax or HEW system, the PAPR should be considered without considering the gamma value.

FIG. 24 is an example specifying the repeated structure of FIG. 23 in more detail.

As shown in the drawing, coefficients c1 to c14 may be applied, or $(1+j)*\text{sqrt}(½)$ may be applied, and additional values, such as a1 to a4, may also be applied.

Based on the content of FIG. 24, an example of the STF sequence that is optimized for the PAPR is as shown below.

First of all, the M sequence may be determined as shown below in Equation 23.

$$M = \{-1, 1, -1, 1, -1, -1, 1, 1, -1, -1, 1, 1, 1, 1, 1\} \quad \text{<Equation 23>}$$

In this case, the STF sequence respective to the 40 MHz and 80 MHz bands may be determined in accordance with the equations shown below. Since the STF sequence for the 20 MHz band is the same as example (B) (i.e., the same as Equation 14), the indication of the same will be omitted.

$$\text{HE\_STF\_40 MHz}(-240:8:240) = \{M, M, 0, -M, M\} * (1+j)/\text{sqrt}(2) \quad \text{<Equation 24>}$$

$$\text{HE\_STF\_40 MHz}(-240:8:240) = \{M, -M, 0, M, M\} * (1+j)/\text{sqrt}(2) \quad \text{<Equation 25>}$$

$$\text{HE\_STF\_80 MHz}(-496:8:496) = \{M, M, -1, M, -M, 1, 0, 1, -M, -M, 1, M, -M\} * (1+j)/\text{sqrt}(2) \quad \text{<Equation 26>}$$

The definition of the variables used in the equations presented above is the same as those used in Equation 1 to Equation 3.

The examples shown in Equation 24 to Equation 26, which are presented above, may be modified to other examples, as shown below.

First of all, the M sequence that is basically used may be modified as shown in Equation 27.

$$M = \{-1, -1, -1, 1, 1, 1, -1, 1, 1, 1, -1, 1, 1, -1, 1\} \quad \text{<Equation 27>}$$

The 2×HE-STF sequences for the 40 MHz band and the 80 MHz band may be generated by using a method of applying Equation 27, which is presented above, to the equation shown below. Since the STF sequence for the 20 MHz band is the same as example (B), the indication of the same will be omitted.

$$\text{HE\_STF\_40 MHz}(-240:8:240) = \{M, -M, 0, M, M\} * (1+j)/\text{sqrt}(2) \quad \text{<Equation 28>}$$

$$\text{HE\_STF\_40 MHz}(-240:8:240) = \{M, M, 0, -M, M\} * (1+j)/\text{sqrt}(2) \quad \text{<Equation 29>}$$

$$\text{HE\_STF\_80 MHz}(-496:8:496) = \{M, -M, -1, M, M, -1, 0, -1, -M, M, -1, M, M\} * (1+j)/\text{sqrt}(2) \quad \text{<Equation 30>}$$

FIG. 25 is a drawing indicating the above-described examples of the PAPR in RU units that are used in a 20 MHz band.

Each block shown in FIG. 25 respectively indicates 26-RU, 52-RU, 106-RU, and 242-RU, which are shown in FIG. 4.

The example of the above-described Equation 23 to Equation 26 may be indicated as example (C-1), and the example of the above-described Equation 27 to Equation 30 may be indicated as example (C-2). In this case, the values indicated in each block represent the PAPRs for example (C-1) and example (C-2), respectively.

FIG. 26 is a drawing indicating the above-described examples of the PAPR in RU units that are used in a 40 MHz band. More specifically, each block shown in FIG. 26 respectively indicates 26-RU, 52-RU, 106-RU, 242-RU, and 484-RU, which are shown in FIG. 5.

FIG. 27 is a drawing indicating the above-described examples of the PAPR in RU units that are used in a left side band of a 80 MHz band. And, FIG. 28 is a drawing indicating the above-described examples of the PAPR in RU units that are used in a right side band of a 80 MHz band. More specifically, each block shown in FIG. 27 and FIG. 28 respectively indicates 26-RU, 52-RU, 106-RU, 242-RU, 484-RU, and 996-RU, which are shown in FIG. 6. In the examples shown in FIG. 27 and FIG. 28, in case of the 26-RU (i.e., central 26-RU) that is positioned in the DC band, the PAPR of example (C-1) is equal to 1.94, and the PAPR of example (C-2) is equal to 6.02. Additionally, for the entire band, the PAPR of example (C-1) is equal to 4.99, and the PAPR of example (C-2) is equal to 5.42.

Figure 29:
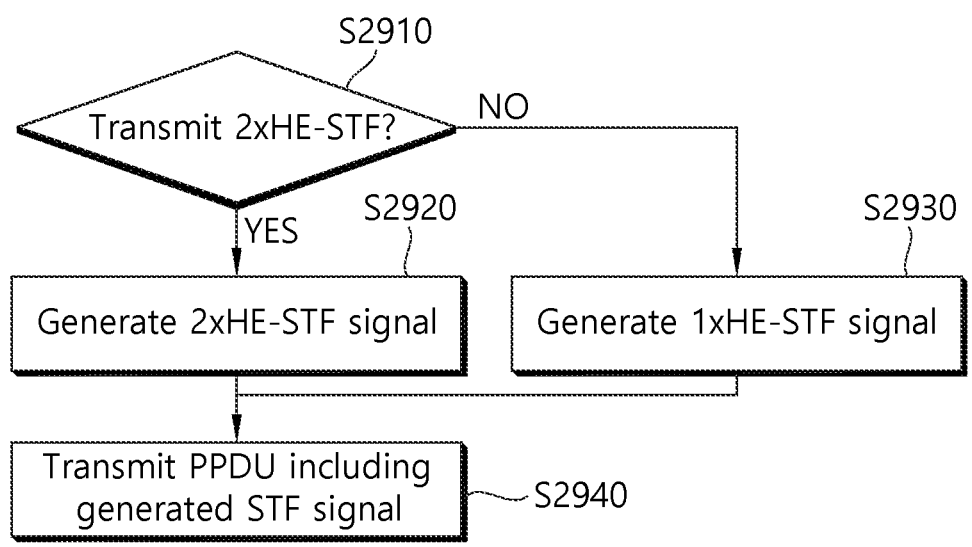
FIG. 29 is a procedure flow chart to which the above-described example can be applied.

FIG. 29 is a procedure flow chart to which the above-described example can be applied.

The example of FIG. 29 may be applied to various transmitting apparatuses, for example, the corresponding example may be applied to user equipments (i.e., non-AP STA).

In step S2910, the transmitting apparatus determines whether to transmit a 1×HE-STF signal or to transmit a 2×HE STF signal. For example, in response to the trigger frame shown in FIG. 9, in case of transmitting the uplink PPDU shown in FIG. 12, the transmitting apparatus may transmit a 2×HE STF signal, and, otherwise, the transmitting apparatus may transmit a 1×HE STF signal.

In case of transmitting the 2×HE-STF, a 2×HE-STF signal may be generated in accordance with step S2920. For example, in case of generating a short training field (STF) signal corresponding to the first frequency band (e.g., a 40 MHz band), the STF signal corresponding to the first frequency band may be generated based on a sequence in which a predetermined M sequence is repeated. In this case, the repeated sequence may be defined as $\{M, -1, -M\ 0, M, -1, M\}*(1+j)/\text{sqrt}(2)$. The M sequence may correspond to $M=\{-1, -1, -1, 1, 1, 1, -1, 1, 1, 1, -1, 1, 1, -1, 1\}$. The $\{M, -1, -M\ 0, M, -1, M\}*(1+j)/\text{sqrt}(2)$ sequence is positioned at intervals of 8 tones within a range of a lowest tone having a tone index of $-248$ and a highest tone having a tone index of $+248$. And, in the $\{M, -1, -M\ 0, M, -1, M\}*(1+j)/\text{sqrt}(2)$, elements corresponding to each of the tone indexes $-248$ and $+248$ may be processed with nulling. Additionally, in case of generating a STF signal corresponding to a second frequency band, a $\{M, -1, M, -1, -M, -1, M, 0, -M, 1, M, 1, -M, 1, -M\}*(1+j)/\text{sqrt}(2)$ sequence may be used.

In other words, in step S2920, at least any one of the 2×HE-STF signals proposed in the above-described Example (B) or Example (C) may be used.

In case of transmitting the 1×HE-STF, a 1×HE-STF signal may be generated in accordance with step S2930. In this case, at least any one of the 1×HE-STF signals proposed in the above-described Example (A) may be used.

In step S2940, the generated HE-STF signal is transmitted to a receiving device.

Example (D): Selecting a STF Sequence in Accordance with the PAPR

Example (D), which will hereinafter be described in detail, proposes an example for configuring an uplink PPDU by using some of sequences presented in the above-described examples.

For example, as shown below, 2×HE-STF sequences for 20 MHz, 40 MHz, and 80 MHz may be configured. More specifically, in case an uplink MU PPDU is transmitted in response to a trigger frame, the STF sequence shown below may be used.

$M=\{-1, -1, -1, 1, 1, 1, -1, 1, 1, 1, -1, 1, 1, -1, 1\}$ $\text{HE\_STF\_20 MHz}(-120:8:120)=\{M, 0, -M\}*(1+j)/\text{sqrt}(2)$         <Equation 31>

$M=\{-1, -1, -1, 1, 1, 1, -1, 1, 1, 1, -1, 1, 1, -1, 1\}$ $\text{HE\_STF\_40 MHz}(-248:8:248)=\{M, -1, -M\ 0, M, -1, M\}*(1+j)/\text{sqrt}(2)$ $\text{HE\_STF\_40 MHz}(\pm 248)=0$         <Equation 32>

$M=\{-1, -1, -1, 1, 1, 1, -1, 1, 1, 1, -1, 1, 1, -1, 1\}$ $\text{HE\_STF\_80 MHz}(-504:8:504)=\{M, -1, M, -1, -M, -1, M, 0, -M, 1, M, 1, -M, 1, -M\}*(1+j)/\text{sqrt}(2)$ $\text{HE\_STF\_80 MHz}(\pm 504)=0$         <Equation 33>

Meanwhile, in case of configuring an uplink PPDU in a user STA, among the RUs shown in FIG. 4 to FIG. 6, it may be possible to configure the STF field only for the RUs that are allocated to the corresponding user STA.

For example, a leftmost 26-RU, which is shown in FIG. 4, is positioned in a section starting from frequency index "$-121$" to frequency index "$-96$". If a user STA is allocated to the leftmost 26-RU, sequences may be generated based on Equation 31, which is presented above. In this case, however, among the generated sequences, the STF field of the uplink MU PPDU may be configured by using only the sequence corresponding to the section starting from frequency index "$-121$" to frequency index "$-96$".

However, in case of configuring the STF field according to the above-described method, the PAPR may be decreased.

Figure 30:
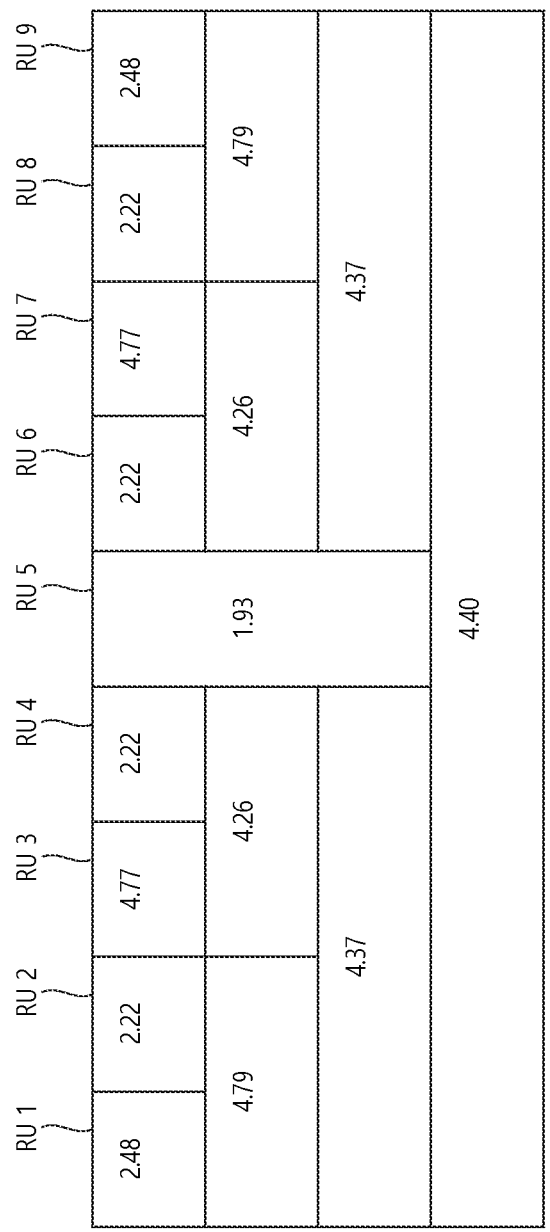
FIG. 30 is a drawing showing a PAPR for RUs that are used in a 20 MHz band.

FIG. 30 is a drawing showing a PAPR for RUs that are used in a 20 MHz band.

The value marked on an uppermost end of FIG. 30 indicates the PAPR for the 26-RU. More specifically, 4 26-RUs (RU1 to RU4) exist on the left side of the central 26-RU (RU5) shown in FIG. 30, and 4 26-RUs (RU6 to RU9) exist on the right side of the central 26-RU (RU5).

In this case, the range of frequency indexes for each 26-RU may correspond to Table 1 shown below.

TABLE 1

| RU type | | | | | |
|---|---|---|---|---|---|
| 26-RU | RU 1 [−121:−96] | RU 2 [−95:−70] | RU 3 [−68:−43] | RU 4 [−42:−17] | RU 5 [−16:−4, 4:16] |
| | RU 6 [17:42] | RU 7 [43:68] | RU 8 [70:95] | RU 9 [96:121] | |

Additionally, as shown in FIG. 4 and FIG. 30, in case of 52-RUs that are used for the 20 MHz band, 2 52-RUs are included on the left side of the central 26-RU, and 2 52-RUs are included on the right side of the central 26-RU. Herein, the range of frequency indexes for each RU may correspond to Table 2 shown below. Additionally, as shown in FIG. 4 and FIG. 30, 2 106-RUs that are used for the 20 MHz band exist, and 1 242-RU that is used for the 20 MHz band exists. And, herein, the range of frequency indexes for each RU may correspond to Table 2 shown below.

TABLE 2

| RU type | | | | |
|---|---|---|---|---|
| 52-RU | RU 1 [−121:−70] | RU 2 [−68:−17] | RU 3 [17:68] | RU 4 [70:121] |
| 106-RU | RU 1 [−122:−17] | | | RU 2 [17:122] |
| 242-RU | RU 1 [−122:−2, 2:122] | | | |

For example, among the 4 52-RUs shown in Table 2, even if RU1 is allocated to a specific user, as shown in FIG. 30, it is apparent that the PAPR of RU2 or RU3 is lower. In this case, even if RU1 is allocated, it is preferable that the user configures the STF field by using a STF sequence corresponding to RU2 or RU3. More specifically, in case the user receives a trigger frame and configures an uplink MU PPDU corresponding to the received trigger frame, the user configures an STF field corresponding only to the RU that are allocated to the user. And, in this case, it is preferable that the STF field is configured by using a sequence having a PAPR of 4.26 (i.e., a STF sequence corresponding to the frequency index of RU2 or RU3). In case a 26-RU is allocated, it is preferable to use a STF sequence corresponding to a RU having a PAPR of 2.22.

FIG. 31 is a drawing showing a PAPR for RUs that are used in a 40 MHz band.

The value marked on an uppermost end of FIG. 31 indicates the PAPR for the 26-RU. More specifically, 9 26-RUs (RU1 to RU9) exist on the left side of the central 26-RU (RU5) shown in FIG. 31, and 9 26-RUs (RU10 to RU18) exist on the right side of the central 26-RU (RU5).

In this case, the range of frequency indexes for each 26-RU may correspond to Table 3 shown below.

TABLE 3

| RU type | | | | | |
|---|---|---|---|---|---|
| 26-RU | RU 1 [−243:−218] | RU 2 [−217:−192] | RU 3 [−189:−164] | RU 4 [−163:−138] | RU 5 [−136:−111] |
| | RU 6 [−109:−84] | RU 7 [−83:−58] | RU 8 [−55:−30] | RU 9 [−29:−4] | |
| | RU 10 [4:29] | RU 11 [30:55] | RU 12 [58:83] | RU 13 [84:109] | RU 14 [111:136] |
| | RU 15 [138:163] | RU 16 [164:189] | RU 17 [192:217] | RU 18 [218:243] | |

Additionally, as shown in FIG. 5 and FIG. 31, in case of 52-RUs that are used for the 40 MHz band, 4 52-RUs are included on the left side of the central 26-RU, and 4 52-RUs are included on the right side of the central 26-RU. Herein, the range of frequency indexes for each RU may correspond to Table 4 shown below. Additionally, as shown in FIG. 5 and FIG. 31, 4 106-RUs that are used for the 40 MHz band exist, 2 242-RUs that are used for the 40 MHz band exist, and 1 484-RU that is used for the 40 MHz band exists. And, herein, the range of frequency indexes for each RU may correspond to Table 4 shown below.

TABLE 4

| RU type | | | | |
|---|---|---|---|---|
| 52-RU | RU 1 [−243:−192] | RU 2 [−189:−138] | RU 3 [−109:−58] | RU 4 [−55:−4] |
| | RU 5 [4:55] | RU 6 [58:109] | RU 7 [138:189] | RU 8 [192:243] |
| 106-RU | RU 1 [−243:−138] | RU 2 [−109:−4] | RU 3 [4:109] | RU 4 [138:243] |
| 242-RU | RU 1 [−244:−3] | | RU2 [3:244] | |
| 484-RU | RU 1 [−244:−3, 3:244] | | | |

For example, it is preferable that a user being allocated with 26-RUs for the 40 MHz band uses a STF sequence corresponding to the RU having a PAPR of 2.22. Also, it is preferable that a user being allocated with 52-RUs uses a STF sequence corresponding to the RU having a PAPR of 2.90. Additionally, it is preferable that a user being allocated with 106-RUs uses a STF sequence corresponding to the RU having a PAPR of 4.39. Moreover, it is preferable that a user being allocated with 242-RUs uses a STF sequence corresponding to the RU having a PAPR of 5.46.

FIG. 32 and FIG. 33 are drawings respectively showing a PAPR for RUs that are used in a 80 MHz band. In the 80 MHz band, the PAPR of the central 26-RU is equal to 1.94, and the PAPR of the entire band is equal to 5.77.

The values respectively marked on uppermost ends of FIG. 32 and FIG. 33 indicate the PAPR for the 26-RU. More specifically, the RUs shown in FIG. 32 correspond to RUs positioned on the left side of the central frequency, and the RUs shown in FIG. 33 correspond to RUs positioned on the right side of the central frequency. The range of frequency indexes for the 18 26-RUs (RU1 to RU18), which are shown in FIG. 32, may correspond to Table 5 shown below. Additionally, the range of frequency indexes for the 18 26-RUs (RU20 to RU37), which are shown in FIG. 33, may correspond to Table 5 shown below.

TABLE 5

| RU type | | | | | |
|---|---|---|---|---|---|
| 26-RU | RU 1 [−499:−474] | RU 2 [−473:−448] | RU 3 [−445 −420] | RU 4 [−419:−394] | RU 5 [−392:−367] |
| | RU 6 [−365:−340] | RU 7 [−339:−314] | RU 8 [−311:−286] | RU 9 [−285:−260] | |
| | RU 10 [−257:−232] | RU 11 [−231:−206] | RU 12 [−203:−178] | RU 13 [−177:−152] | RU 14 [−150:−125] |
| | RU 15 [−123:−98] | RU 16 [−97:−72] | RU 17 [−69:−44] | RU 18 [−43:−18] | RU 19 [−16:−4, 4:16] |
| | RU 20 [18:43] | RU 21 [44:69] | RU 22 [72:97] | RU 23 [98:123] | RU 24 [125:150] |
| | RU 25 [152:177] | RU 26 [178:203] | RU 27 [206:231] | RU28 [232:257] | |
| | RU 29 [260:285] | RU 30 [286:311] | RU 31 [314:339] | RU 32 [340:365] | RU 33 [367:392] |
| | RU 34 [394:419] | RU 35 [420:445] | RU 36 [448:473] | RU37 [474:499] | |

Additionally, as shown in FIG. 6 and FIG. 32, in case of the 52-RUs that are used for the 80 MHz band, 8 52-RUs are included on the left side of the central 26-RU. Also, as shown in FIG. 6 and FIG. 33, in case of the 52-RUs that are used for the 80 MHz band, 8 52-RUs are included on the right side of the central 26-RU. Herein, the range of frequency indexes for each RU may correspond to Table 6 shown below. Additionally, as shown in FIG. 6, FIG. 32, and FIG. 33, 8 106-RUs that are used for the 80 MHz band exist, 4 242-RUs that are used for the 80 MHz band exist, 2 484-RU that are used for the 40 MHz band exist, and 1 996-RU that is used for the 80 MHz band exists. And, herein, the range of frequency indexes for each RU may correspond to Table 6 shown below.

TABLE 6

| RU type | | | | |
|---|---|---|---|---|
| 52-RU | RU 1 [−499:−448] | RU 2 [−445:−394] | RU 3 [−365:−314] | RU 4 [−311:−260] |
| | RU 5 [−257:−206] | RU 6 [−203:−152] | RU 7 [−123:−72] | RU 8 [−69:−18] |
| | RU 9 [18:69] | RU 10 [72:123] | RU 11 [152:203] | RU 12 [206:257] |
| | RU 13 [260:311] | RU 14 [314:365] | RU 15 [394:445] | RU 16 [448:499] |
| 106-RU | RU 1 [−499:−394] | RU 2 [−365:−260] | RU 3 [−257:−152] | RU 4 [−123:−18] |
| | RU 5 [18:123] | RU 6 [152:257] | RU 7 [260:365] | RU 8 [394:499] |
| 242-RU | RU 1 [−500:−259] | RU 2 [−258:−17] | RU 3 [17:258] | RU 4 [259:500] |
| 484-RU | RU 1 [−500:−17] | | RU 2 [17:500] | |

TABLE 6-continued

| RU type | |
|---|---|
| 996-RU | RU 1 [−500:−3, 3:500] |

For example, it is preferable that a user being allocated with 26-RUs for the 40 MHz band uses a STF sequence corresponding to the RU having a PAPR of 2.22. Also, it is preferable that a user being allocated with 52-RUs uses a STF sequence corresponding to the RU having a PAPR of 2.90. Additionally, it is preferable that a user being allocated with 106-RUs uses a STF sequence corresponding to the RU having a PAPR of 4.39. Moreover, it is preferable that a user being allocated with 242-RUs uses a STF sequence corresponding to the RU having a PAPR of 5.50.

Figure 34:
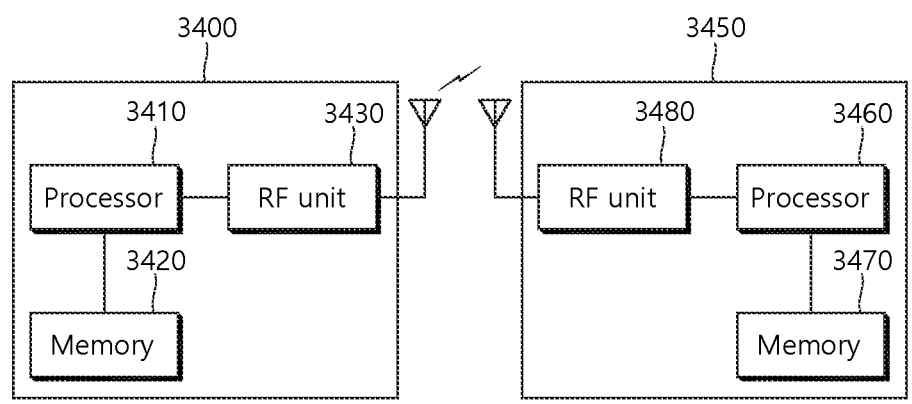
FIG. 34 is a block diagram showing a wireless device to which the exemplary embodiment of the present invention can be applied.

FIG. 34 is a block view showing a wireless device to which the exemplary embodiment of the present invention can be applied.

Referring to FIG. 34, as a station (STA) that can implement the above-described exemplary embodiment, the wireless device may correspond to an AP or a non-AP station (non-AP STA). The wireless device may correspond to the above-described user or may correspond to a transmitting device transmitting a signal to the user.

The AP 3400 includes a processor 3410, a memory 3420, and a radio frequency unit (RF unit) 3430.

The RF unit 3430 is connected to the processor 3410, thereby being capable of transmitting and/or receiving radio signals.

The processor 3410 implements the functions, processes, and/or methods proposed in this specification. For example, the processor 3410 may be realized to perform the operations according to the above-described exemplary embodiments of the present invention. More specifically, the processor 3410 may perform the operations that can be performed by the AP, among the operations that are disclosed in the exemplary embodiments of FIG. 1 to FIG. 33.

The non-AP STA 3450 includes a processor 3460, a memory 3470, and a radio frequency (RF) unit 3480.

The RF unit 3480 is connected to the processor 3460, thereby being capable of transmitting and/or receiving radio signals.

The processor 3460 may implement the functions, processes, and/or methods proposed in the exemplary embodiment of the present invention. For example, the processor 3460 may be realized to perform the non-AP STA operations according to the above-described exemplary embodiments of the present invention. The processor may perform the operations of the non-AP STA, which are disclosed in the exemplary embodiments of FIG. 1 to FIG. 33.

The processor 3410 and 3460 may include an application-specific integrated circuit (ASIC), another chip set, a logical circuit, a data processing device, and/or a converter converting a baseband signal and a radio signal to and from one another. The memory 3420 and 3470 may include a read-only memory (ROM), a random access memory (RAM), a flash memory, a memory card, a storage medium, and/or another storage device. The RF unit 3430 and 3480 may include one or more antennas transmitting and/or receiving radio signals.

When the exemplary embodiment is implemented as software, the above-described method may be implemented as a module (process, function, and so on) performing the above-described functions. The module may be stored in the memory 3420 and 3470 and may be executed by the processor 3410 and 3460. The memory 3420 and 3470 may be located inside or outside of the processor 3410 and 3460 and may be connected to the processor 3410 and 3460 through a diversity of well-known means.

What is claimed is:

1. A method in a wireless local area network (LAN) system, the method comprising:
   generating a short training field (STF) signal for a frequency band, wherein the STF signal is generated based on an STF sequence which includes an M sequence; and
   transmitting the STF signal on the frequency band,
   wherein the M sequence is defined as M={−1, −1, −1, 1, 1, 1, −1, 1, 1, 1, −1, 1, 1, −1, 1}, and
   wherein the STF sequence is a frequency-domain sequence, and wherein:
   (i) for the frequency band corresponding to 80 MHz: the STF sequence is defined as {M, −1, M, −1, −M, −1, M, 0, −M, 1, M, 1, −M, 1, −M}*(1+j)/sqrt(2), and
   (ii) for the frequency band corresponding to 40 MHz: the STF sequence is defined as {M,−1, −M, 0, M, −1, M} * (1+j)/sqrt (2),
   wherein sqrt ( ) denotes a square root and "*" denotes multiplication.

2. The method of claim 1, wherein elements in the STF sequence are defined in units of 78.125 kHz.

3. The method of claim 1, wherein the STF sequence is defined so as to reduce a Peak-to-Average Power Ratio (PAPR) of the transmission of the STF signal.

4. The method of claim 1, further comprising using the transmission of the STF signal for uplink Orthogonal Frequency Division Multiple Access (OFDMA) transmission.

5. The method of claim 1, wherein the transmission of the STF signal includes at least one resource unit (RU), the at least one RU including at least 26, 52, 106, or 242 tones.

6. A transmitting apparatus configured to operate in a wireless local area network (LAN) system, the transmitting apparatus comprising:
   at least one processor; and
   at least one computer memory operably connectable to the at least one processor and storing instructions that, based on being executed by the at least one processor, perform operations comprising:
   generating a short training field (STF) signal for a frequency band, wherein the STF signal is generated based on an STF sequence which includes an M sequence; and
   transmitting the STF signal on the frequency band,
   wherein the M sequence is defined as M={−1, −1, −1, 1, 1, 1, −1, 1, 1, 1, −1, 1, 1, −1, 1}, and
   wherein the STF sequence is a frequency-domain sequence, and wherein:
   (i) for the frequency band corresponding to 80 MHz: the STF sequence is defined as {M, −1, M, −1, −M, −1, M, 0, −M, 1, M, 1, −M, 1, −M}*(1+j)/sqrt(2), and
   (ii) for the frequency band corresponding to 40 MHz: the STF sequence is defined as {M, −1, −M, 0, M, −1, M} * (1+j)/sqrt (2),
   wherein sqrt ( ) denotes a square root and "*" denotes multiplication.

7. The transmitting apparatus of claim 6, wherein elements in the STF sequence are defined in units of 78.125 kHz.

8. The transmitting apparatus of claim 6, wherein the STF sequence is defined so as to reduce a Peak-to-Average Power Ratio (PAPR) of the transmission of the STF signal.

9. The transmitting apparatus of claim 6, wherein the operations further comprise:
   using the transmission of the STF signal for uplink Orthogonal Frequency Division Multiple Access (OFDMA) transmission.

10. The transmitting apparatus of claim 6, wherein the transmission of the STF signal includes at least one resource unit (RU), the at least one RU including at least 26, 52, 106, or 242 tones.

* * * * *